United States Patent
Chapman et al.

(10) Patent No.: US 8,611,107 B2
(45) Date of Patent: Dec. 17, 2013

(54) METHOD AND SYSTEM FOR CONTROLLING A MULTI-STAGE POWER INVERTER

(75) Inventors: Patrick Chapman, Austin, TX (US); Andrew O'Connell, Austin, TX (US); Timothy Sams, Austin, TX (US); Eric Martina, Houston, TX (US)

(73) Assignee: SolarBridge Technologies, Inc., Austin, TX (US)

( * ) Notice: Subject to any disclaimer, the term of this patent is extended or adjusted under 35 U.S.C. 154(b) by 0 days.

(21) Appl. No.: 13/095,179

(22) Filed: Apr. 27, 2011

(65) Prior Publication Data

US 2011/0261601 A1 Oct. 27, 2011

(51) Int. Cl.
*H02M 3/335* (2006.01)

(52) U.S. Cl.
USPC .................... 363/21.04; 363/21.12; 323/906

(58) Field of Classification Search
USPC .............. 323/906; 363/15, 21.04, 21.12, 131, 363/132; 307/46, 82
See application file for complete search history.

(56) References Cited

U.S. PATENT DOCUMENTS

| | | | |
|---|---|---|---|
| 3,670,230 A | 6/1972 | Rooney et al. | |
| 4,114,048 A | 9/1978 | Hull | |
| 4,217,633 A | 8/1980 | Evans | |
| 4,277,692 A | 7/1981 | Small | |
| 4,287,465 A | 9/1981 | Godard et al. | |
| 4,651,265 A | 3/1987 | Stacey et al. | |
| 4,661,758 A | 4/1987 | Whittaker | |
| 4,707,774 A | 11/1987 | Kajita | |
| 4,709,318 A | 11/1987 | Gephart et al. | |
| 4,719,550 A | 1/1988 | Powell et al. | |
| 4,725,740 A | 2/1988 | Nakata | |
| 5,041,959 A | 8/1991 | Walker | |
| 5,148,043 A | 9/1992 | Hirata et al. | |
| 5,160,851 A | 11/1992 | McAndrews | |
| 5,191,519 A | 3/1993 | Kawakami | |
| 5,309,073 A | 5/1994 | Kaneko et al. | |
| 5,343,380 A | 8/1994 | Champlin | |
| 5,473,528 A | 12/1995 | Hirata | |
| 5,625,539 A * | 4/1997 | Nakata et al. | 363/17 |
| 5,668,464 A | 9/1997 | Krein | |
| 5,684,385 A | 11/1997 | Guyonneau et al. | |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Kutkut, "PV Energy Conversion and System Integration," Florida Energy Systems Consortium, 2009, 24 pages.

(Continued)

*Primary Examiner* — Adolf Berhane
*Assistant Examiner* — Emily P Pham
(74) *Attorney, Agent, or Firm* — Barnes & Thornburg LLP

(57) ABSTRACT

A method for controlling an multi-stage inverter comprises controlling an input converter of the multi-stage inverter with an input controller and controlling an output converter of the multi-stage inverter with an output controller separate from the input controller. The input controller and output controller may be galvanically isolated. Additionally, the method may include communicating data between the input controller and the output controller over a power bus of the multi-stage inverter.

20 Claims, 21 Drawing Sheets

(56) References Cited

U.S. PATENT DOCUMENTS

| | | |
|---|---|---|
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,848,101 A * | 12/1998 | Taylor ............................ 375/257 |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,268,559 B1 | 7/2001 | Yamawaki |
| 6,268,735 B1 * | 7/2001 | Craig et al. .................... 324/603 |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,563,718 B1 * | 5/2003 | Li et al. ............................ 363/16 |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,116,114 B2 * | 10/2006 | Kajita ............................. 324/613 |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 * | 3/2008 | Jepsen et al. .................... 307/82 |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,479,774 B2 * | 1/2009 | Wai et al. ........................ 323/284 |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,710,752 B2 | 5/2010 | West |
| 7,733,679 B2 | 6/2010 | Luger et al. |
| 7,768,155 B2 | 8/2010 | Fornage |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| RE42,039 E * | 1/2011 | West et al. ..................... 363/132 |
| 7,899,632 B2 | 3/2011 | Fornage et al. |
| 7,916,505 B2 | 3/2011 | Fornage |
| 8,085,564 B2 * | 12/2011 | Klodowski et al. ............. 363/97 |
| 2001/0043050 A1 | 11/2001 | Fisher |
| 2002/0017822 A1 | 2/2002 | Umemura et al. |
| 2002/0196026 A1 | 12/2002 | Kimura et al. |
| 2005/0213272 A1 | 9/2005 | Kobayashi |
| 2005/0275386 A1 * | 12/2005 | Jepsen et al. ....................... 322/9 |
| 2006/0067137 A1 | 3/2006 | Udrea |
| 2006/0083039 A1 | 4/2006 | Oliveira |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0203397 A1 | 8/2008 | Amaratunga et al. |
| 2008/0266922 A1 * | 10/2008 | Mumtaz et al. ................ 363/131 |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0109597 A1 * | 5/2010 | Steiner et al. .................. 318/772 |
| 2010/0118983 A1 * | 5/2010 | Weber et al. ................... 375/257 |
| 2010/0118985 A1 | 5/2010 | Rozenboim |
| 2010/0139945 A1 | 6/2010 | Dargatz |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |
| 2010/0327659 A1 | 12/2010 | Lisi et al. |
| 2011/0012429 A1 | 1/2011 | Fornage |
| 2011/0019444 A1 | 1/2011 | Dargatz et al. |
| 2011/0026281 A1 | 2/2011 | Chapman et al. |
| 2011/0026282 A1 | 2/2011 | Chapman et al. |
| 2011/0043160 A1 | 2/2011 | Serban |
| 2011/0049990 A1 | 3/2011 | Amaratunga et al. |
| 2011/0051820 A1 | 3/2011 | Fornage |
| 2011/0058398 A1 | 3/2011 | Agbossou et al. |
| 2011/0130889 A1 | 6/2011 | Khajehoddin et al. |

(56) References Cited

U.S. PATENT DOCUMENTS

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | WO 2004008619 A2 | 1/2004 |
| WO | WO 2004100348 A1 | 11/2004 |
| WO | WO 2004100348 A8 | 12/2005 |
| WO | WO 2006048688 A1 | 5/2006 |
| WO | WO 2007080429 A2 | 7/2007 |
| WO | WO 2009081205 A2 | 7/2009 |
| WO | WO 2009081205 A3 | 10/2009 |
| WO | WO 2009134756 A1 | 11/2009 |

OTHER PUBLICATIONS

Kwon et al., "High-efficiency Module-integrated Photovoltaic Power Conditioning System," IET Power Electronics, doi: 10.1049/iet-pel. 2008.0023, 2008.
Lohner et al., "A New Panel-integratable Inverter Concept for Grid-Connected Photovoltaic Systems," IEEE ISIE '96, vol. 2, pp. 827-831, 1996.
Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.
Martins et al., "Interconnection of a Photovoltaic Panels Array to a Single-Phase Utility Line From a Static Conversion System," Proc. IEEE Power Electronics Specialists Conf., pp. 1207-1211, 2000.
Martens et al., "Usage of the Solar Energy from the Photovoltaic Panels for the Generation of Electrical Energy," The 21st International Telecommunication Energy Conference, 6 pages, 1999.
Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.
Meinhardt et al., "Miniaturised 'low profile' Module Integrated Converter for Photovoltaic Applications with Integrated Magnetic Components," IEEE APEC '99, vol. 1, pp. 305-311, 1999.
Meza et al., "Boost-Buck Inverter Variable Structure Control for Grid-Connected Photovoltaic Systems," IEEE International Symposium on Circuits and Systems, vol. 2, pp. 1318-1321, 2005.
Midya et al., "Dual Switched Mode Power Converter," 15th Annual Conference of IEEE Industrial Electronics Society, vol. 1, pp. 155-158, Mar. 1989.
Midya et al., "Sensorless Current Mode Control—An Observer-Based Technique for DC-DC Converters," IEEE Transactions on Power Electronics, vol. 16, No. 4, pp. 522-526, Jul. 2001.
Nikraz et al., "Digital Control of a Voltage Source Inverter in Photovoltaic Applications," 35th Annual IEEE Power Electronics Specialists Conference, pp. 3266-3271, 2004.
Oldenkamp et al., "AC Modules: Past, Present and Future, Workshop Installing the Solar Solution," Jan. 1998, Hatfield, UK, 6 pages.
Pajic et al., "Unity Power Factor Compensation for Burst Modulated Loads," IEEE Power Engineering Society General Meeting, vol. 2, pp. 1274-1277, 2003.
Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.
Rodriguez et al., "Dynamic Stability of Grid-Connected Photovoltaic Systems," Power Engineering Society General Meeting, vol. 2, pp. 2193-2199, 2004.
Rodriguez et al., "Long-Lifetime Power Inverter for Photovoltaic AC Modules," IEEE Transaction on Industrial Electronics, vol. 55, No. 7, pp. 2593-2601, Jul. 2008.
Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.
Russell et al., "SunSine300 AC Module, Annual Report Jul. 25, 1995-Dec. 31, 1996," NREL/SR-520-23432, UC Category 1280, 1997, 31 pages.
Schmidt et al., "Control of an Optimized Converter for Modular Solar Power Generation," 20th International Conference on Industrial Electronics, Control and Instrumentation, vol. 1, pp. 479-484, 1994.
Schutten et al., "Characteristics of Load Resonant Converters Operated in a High-Power Factor Mode," IEEE, Trans. Power Electronics, vol. 7, No. 2, pp. 5-16, 1991.
Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.
Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.
Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.
Strong et al., "Development of Standardized, Low-Cost AC PV Systems—Phase I Annual Report," NREL/SR-520-23002, Jun. 1997, 18 pages.
Strong et al., "Development of Standardized, Low-Cost AC PV Systems—Final Technical Report," NREL/SR-520-26084, Feb. 1999, 27 pages.
Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.
Takahashi et al., "Development of Long Life Three Phase Uninterruptible Power Supply Using Flywheel Energy Storage Unit," Proc. Int'l. Conf. Power Electronics, vol. 1, pp. 559-564, 1996.
Takahashi et al., "Electrolytic Capacitor-Less PWM Inverter", in Proceedings of the IPEC '90, Tokyo, Japan, pp. 131-138, Apr. 2-6, 1990.
Thomas et al., "Design and Performance of Active Power Filters," IEEE IAS Magazine, 9 pages, 1998.
Tian, "Solar-Based Single-Stage High-Efficiency Grid-Connected Inverter," Masters Thesis, University of Central Florida, Orlando, 83 pages, 2005.
Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.
Wada et al., "Reduction Methods of Conducted EMI Noise on Parallel Operation for AC Module Inverters," 2007 IEEE Power Electronics Specialists Conference, pp. 3016-3021, Jun. 2007.
Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.
Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.
Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.

(56) References Cited

OTHER PUBLICATIONS

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.
Xue et al., "Topologies of Single-Phase Inverters for Small Distributed Power Generators: An Overview," IEEE Transactions on Power Electronics, vol. 19, No. 5, pp. 1305-1314, 2004.
Ando et al., "Development of Single Phase UPS Having AC Chopper and Active Filter Ability," IEEE International Conference on Industrial Technology, 10.1109/ICIT.2006.372445, pp. 1498-1503, 2006.
Biel et al., "Sliding-Mode Control Design of a Boost-Buck Switching Converter for AC Signal Generation," vol. 51, issue 8, pp. 1539-1551, 2004.
Biel et al., "Sliding-Mode Control of a Single-Phase AC/DC/AC Converter," Proceedings of the 40th IEEE Conference on Decision and Control, vol. 1., pp. 903-907, Dec. 2001.
Bose et al., "Electrolytic Capacitor Elimination in Power Electronic System by High Frequency Filter," Conference Record of the 1991 IEEE Industry Applications Society Annual Meeting, vol. 1, pp. 869-878, 1991.
Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.
Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.
Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.
Brekken, "Utility-Connected Power Converter for Maximizing Power Transfer From a Photovoltaic Source," Thesis Submitted to the Faculty of the Graduate School of the University of Minnesota, Jun. 2002, 56 pages.
Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.
Chang et al., "The Impact of Switching Strategies on Power Quality for Integral Cycle Controllers," IEEE Transactions on Power Delivery, vol. 18, No. 3, pp. 1073-1078, Jul. 2003.
Chisenga, "Development of a Low Power Photovoltaic Inverter for Connection to the Utility Grid," PhD Thesis, Fitzwilliam College, Cambridge, 173 pages, 2007.
Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.
Edelmoser, "Improved 2kw Solar Inverter With Wide Input Voltage Range," IEEE 10th Mediterranean Conference, MEIeCon 2000, vol. 2, pp. 810-813, 2000.
Enphase Energy, "Application Note: Multi-Tenant Design Guidelines," rev. 1, 5 pages, 2008.
Enphase Energy, "Enphase Field Wiring Diagram—M190 & M210 Microinverters—240v, Single Phase," Drawing No. 144-00001, rev. 6, 1 page, 2009.
Enphase Energy, "Enphase Micro-Inverter Technical Data," Doc. No. 142-00004, rev. 2, 2 pages, 2008.
Esram et al., "Comparison of Photovoltaic Array Maximum Power Point Tracking Techniques," IEEE Transactions on Energy Conversion, vol. 22, No. 2, pp. 439-449, Jun. 2007.
Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.
Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.
Hung et al., "Analysis and Implementation of a Delay-compensated Deadbeat Current Controller for Solar Inverters," IEEE Proceedings—Circuits, Devices and Systems, pp. 279-286, 2001.
Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.
Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.
Jeong et al., "An Improved Method for Anti-Islanding by Reactive Power Control," pp. 965-970, 2005.
Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.
Jung et al., "High-frequency DC Link Inverter For Grid-Connected Photovoltaic System," Conference Record of the Twenty-Ninth IEEE Photovoltaic Specialists Conference, pp. 1410-1413, 2002.
Kern, "SunSine300: Manufacture of an AC Photovoltaic Module, Final Report, Phases I & II, Jul. 25, 1995-Jun. 30, 1998," NREL/SR-520-26085, 1999, 32 pages.
Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.
Khajehoddin et al., "A Novel Topology and Control Strategy for Maximum Power Point Trackers and Multi-string Grid-connected PV Inverters," Applied Power Electronics Conference, APEC08, pp. 173-178, 2008.
Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.
Km et al., "New Control Scheme for AC-DC-AC Converter Without DC Link Electrolytic Capacitor," 24th Annual IEEE Power Electronics Specialists Conference, PESC '93 Record., pp. 300-306, 1993.
Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.
Kjaer et al., "A Novel Single-Stage Inverter for the AC-module with Reduced Low-Frequency Ripple Penetration," EPE 2003, ISBN 90-75815-07-7, 10 pages, 2003.
Kjaer et al., "A Review of Single-phase Grid-connected Inverters for Photovoltaic Modules," IEEE Trans on Power Electronics, vol. 41, No. 5, pp. 1292-1306, 2005.
Kjaer et al., "Design Optimization of a Single Phase Inverter for Photovoltaic Applications," IEEE 34th Annual Power Electronics Specialist Conference, PESC '03, vol. 3, pp. 1183-1190, 2003.
Kjaer et al., "Power Inverter Topologies for Photovoltaic Modules—A Review," Conf. record of the 37th Industry Applications Conference, vol. 2, pp. 782-788, 2002.
Kjaer, "Design and Control of an Inverter for Photovoltaic Applications," PhD Thesis, Aalborg University Institute of Energy Technology, 236 pages, 2005.
Kjaer, "Selection of Topologies for the PHOTOENERGY™ Project," Aalborg University Institute of Energy Technology, 37 pages, 2002.
Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.
Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.
International Search Report and Written Opinion for International Application No. PCT/US2012/035392, dated Jul. 24, 2012, 14 pages.

\* cited by examiner

METHOD AND SYSTEM FOR CONTROLLING A MULTI-STAGE POWER INVERTER

TECHNICAL FIELD

The present disclosure relates, generally, to power converters for converting direct current (DC) power to alternating current (AC) power and, more particularly, to devices, systems, and methods for converting DC power to AC power suitable for supplying energy to an AC grid and/or an AC load.

BACKGROUND

Power inverters convert a DC power to an AC power. For example, some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

In photovoltaic applications, the power delivered by each photovoltaic cell may vary in magnitude over time due to temporal variations in operating conditions including changes in sunlight intensity, angle of incidence of sunlight, ambient temperature and other factors. As such, photovoltaic cells have an operating point at which the values of the current and voltage of the cell result in an ideal or "maximum" power output. This "maximum power point" ("MPP") is a function of environmental variables, including light intensity and temperature. Inverters for photovoltaic systems may include some form of maximum power point tracking ("MPPT") as a mechanism of identifying and tracking the maximum power point ("MPP") and adjusting the inverter to exploit the full power capacity of the cell at the MPP.

Additionally, in a typical photovoltaic power system, an inverter may be associated with one or more solar cell panels. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small, relatively low voltage (e.g., 25 V). The inverter may be placed in close proximity to the associated solar cell panel to increase the conversion efficiency of the overall system.

Typical photovoltaic inverters include an inverter circuit for converting DC power to AC power and a controller for controlling the functionality of the inverter circuit. Some inverter circuits include an input stage and an output stage. Typical inverter controllers are embodied as single stage controllers. That is, a single inverter controller controls both the input stage and the output stage of the inverter circuit.

SUMMARY

According to one aspect, a method for controlling a multi-stage inverter for converting direct current (DC) power from a DC source to alternating current (AC) power may include controlling operation of an input converter of the multi-stage inverter with a input controller and controlling operation of an output converter of the multi-stage inverter with an output controller that is separate and galvanically isolated from the input controller. The method may also include transmitting data signals between the input controller and the output controller over a DC bus of the multi-stage inverter.

In some embodiments, controlling operation of the input converter may include controlling the input converter to draw a maximum amount of power from a photovoltaic (PV) module. Additionally, controlling operation of the input converter may include sensing a magnitude of a current output and a voltage output of the DC source. In such embodiments, the method may include generating a current command signal based on the magnitude of the current output and the voltage output of the DC source. Additionally, in some embodiments, the method may include sensing a magnitude of a bus voltage of a DC bus electrically connected between input converter and the output converter. In such embodiments, the method may further include generating a plurality of switching signals for an inverter circuit of the input controller based on the magnitude of the current output, the voltage output, and the bus voltage.

In some embodiments, the method may also include controlling the operation of the input converter with the input controller to convert an input DC waveform to an output DC waveform, supplying the output DC waveform to a DC bus, and controlling the operation of the output converter with the output controller to converter the output DC waveform to an AC waveform. Additionally, the method may include supplying power to the input controller from the DC source.

Additionally, in some embodiments, the method may controlling the operation of the output converter to convert a DC waveform to an AC waveform suitable for delivery to an AC grid and supplying power to the output converter from the AC grid. The method may also include sensing a magnitude of a bus voltage of a DC bus electrically connected between input converter and the output converter and generating a plurality of switching signals for an inverter circuit of the output controller based on the magnitude of the bus voltage and an average power bus voltage value. Additionally, the method may include transmitting data from the output controller to a remote device over an AC power line.

According to another aspect, an inverter for converting direct current (DC) power from a DC source to alternating current (AC) power may include an input converter, and output converter, and input controller, and an output controller. The input converter may be electrically coupled to a power bus and configured to convert an input DC waveform to a bus waveform supplied to the power bus based on a first plurality of switching signals. The output converter may be electrically coupled to the power bus and configured to convert the bus waveform to an output AC waveform based on a second plurality of switching signals. The input controller may be electrically coupled to the input converter and may include (i) first sensing circuitry to sense a magnitude of an output voltage of the DC source, a magnitude of an output current of the DC source, and a magnitude of a bus voltage of the power bus and (ii) a first control module configured to generate the first plurality of switching signals based on the magnitude of the output voltage, the output current, and the bus voltage. The output controller may be electrically coupled to the output converter and galvanically isolated from the input controller. The output controller may include (i) second sensing circuitry to sense a magnitude of the bus voltage of the power bus (ii) a second control module configured to generate the second plurality of switching signals based on the magnitude of the bus voltage and an average power bus voltage value.

In some embodiments, the input controller and output controller may include communication circuitry configured to communicate data between the input controller and output controller over the power bus. Additionally, in some embodiments, the input controller may include an internal power supply configured to generate power for the input controller based on a power signal received from the DC source. Additionally or alternatively, the output controller further comprises an internal power supply configured to generate power for the output controller based on a power signal received from an AC grid. The output controller may also include a power line communication circuit configured to communicate with a remote device over an AC power line in some embodiments.

According to a further aspect, a method for controlling a multi-stage inverter for converting direct current (DC) power from a DC source to alternating current (AC) power, the multi-stage inverter including a DC bus, may include controlling operation of an input converter of the multi-stage inverter electrically coupled to the DC bus with a input controller, controlling operation of an output converter of the multi-stage inverter electrically coupled to the DC bus with an output controller that is galvanically isolated from the input controller, and communicating data from the input controller to the output controller over the DC bus.

In some embodiments, the method may include modulating a bus voltage of the DC bus to communicate the data from the input controller to the output controller. Additionally, in some embodiments, the method may include transmitting data from output controller to a remote device over an AC power line.

DETAILED DESCRIPTION

Figure 1:
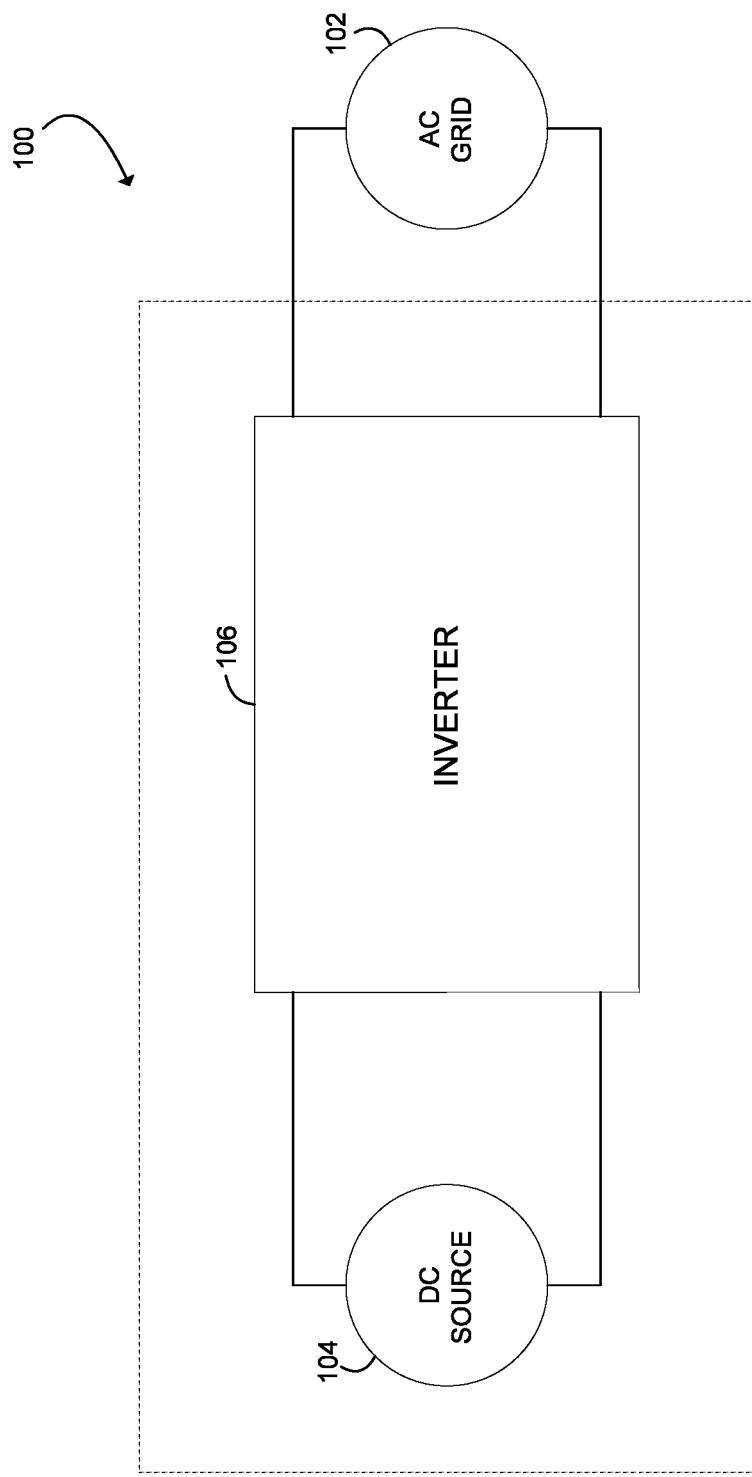
FIG. 1 is a simplified block diagram of one embodiment a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC source 104 may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e.g., $f=\omega/2\pi=50$ Hz or 60 Hz).

Figure 2:
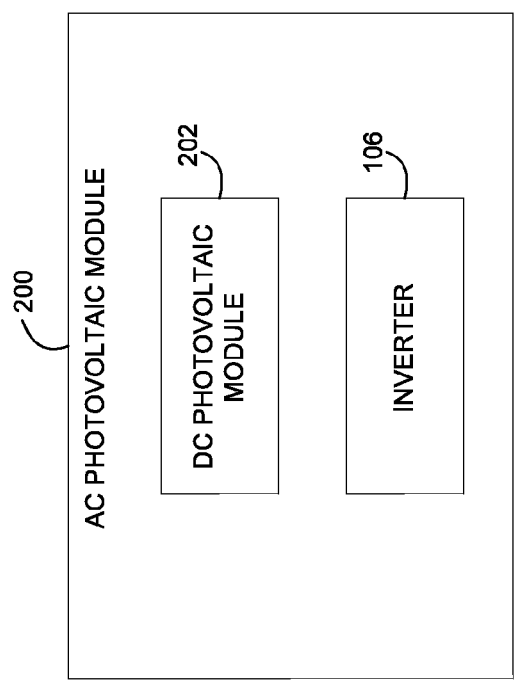
FIG. 2 is a simplified block diagram one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other so as to embody an AC photovoltaic module (ACPV) 200 as illustrated in FIG. 2. The ACPV 200 includes a DC photovoltaic module (DCPV) 202, which operates as the DC source 104, electrically coupled to the inverter 106. The DCPV 202 includes one or more photovoltaic cells and is configured to deliver a DC waveform to the inverter 106 in response to receiving an amount of sunlight. The DC power delivered by the ACPV 200 is a function of environmental variables, such as, e.g., sunlight intensity, sunlight angle of incidence and temperature. In some embodiments, the inverter 106 is positioned in a housing of the ACPV 200. Alternatively, the inverter 106 may include its own housing secured to the housing of the ACPV 200. Additionally, in some embodiments, the inverter 106 is separate from the housing, but located near the DCPV 202. As discussed above, the inverter 106 is configured to convert the DC power received from the DCPV 202 to an AC power suitable for delivery to the AC grid 102 at the grid frequency. It should be appreciated that multiple ACPVs 200 may be used to form a solar array with each ACPV 200 having a dedicated inverter 106.

Figure 3:
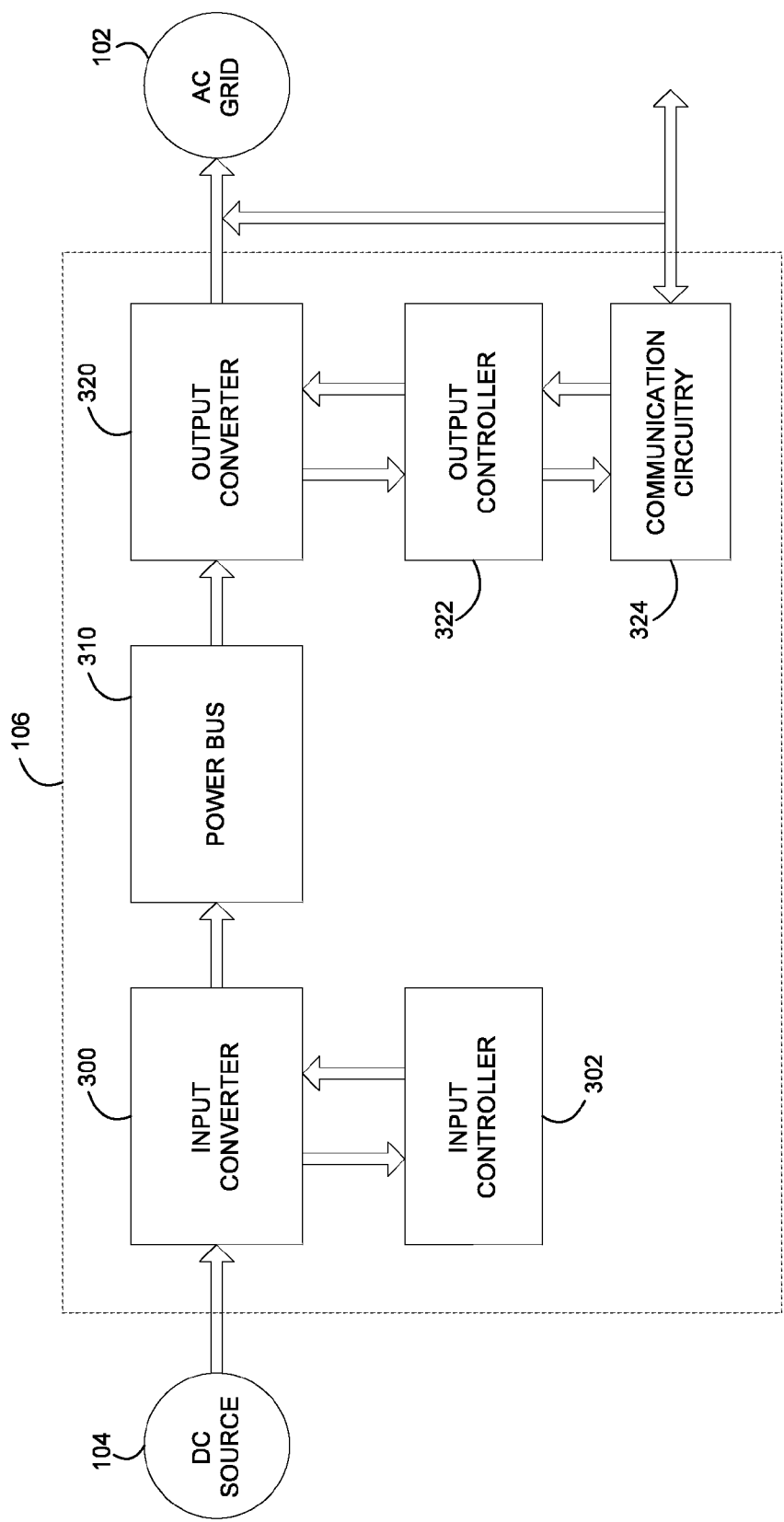
FIG. 3 is a simplified block diagram of one embodiment of an inverter of the system of FIG. 1.

Referring now to FIG. 3, in one embodiment, the inverter 106 includes an input converter 300, a power bus 310, and an output converter 320. The input converter 300 is electrically coupled to the power bus 310 and is electrically couplable to the DC source 104 as shown in FIG. 3. Similarly, the output converter 320 is electrically coupled to the power bus 310 and electrically couplable to the AC grid 102. The inverter 106 also includes an input controller 302 and an output controller 322. It should be appreciated that the output controller 322 is separate from the input controller 302. That is, although the controllers 302, 322 may be housed in a single housing, the circuitry of the controllers 302, 322 are separate from each other. For example, the input controller 302 and the output controller 322 may be implanted on separate, individual semiconductor chips or the like. Additionally, as discussed in more detail below, it should be appreciated that the input controller 302 and the output controller 322 are galvanically isolated from each other. Further, it should be appreciated that such separation and isolation between the controllers 302, 322 may lower the overall output noise of the inverter.

Because the controllers 302, 322 are separated and isolated from each other as discussed above, the controllers 302, 322 may be incapable of direct communications between each other. That is, the controllers 302, 322 may be incapable of directly communicating from one controller 302, 322 to the other controller 302, 322 without the use of intervening devices or circuitry. However, in some embodiments as discussed below, the controllers 302, 322 may be configured to communicate with each over the power bus 310. For example, the input controller 332 may be configured to modulate data onto the waveform of the power bus 310, which is subsequently demodulated by the output controller 322.

Additionally, in some embodiments, the inverter 106 may include communication circuitry 324. The communication circuitry 324 may be communicatively coupled to the output controller 322 or may be incorporated therein in some embodiments. The output controller 322 may utilize the communication circuitry 324 to communicate with remote devices, such as remote controllers or servers. In one particular embodiment, the communication circuitry 324 is embodied as a power line communication circuit configured to communicate with remote devices over an AC power line, such as the AC power line interconnects coupled to the output of the output converter 320. However, in other embodiments, other communication technologies and/or protocols may be used. For example, in some embodiments, the communication circuitry 324 may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

In use, the input converter 300 of the inverter 106 is configured to be electrically coupled to the DC source 104 to receive a DC waveform therefrom. The input converter 300 converts the DC waveform to a bus waveform, which in the illustrative embodiment is a DC waveform but may be an AC waveform in other embodiments. Similarly, the output converter 320 is configured to be electrically coupled to the AC grid 102 and convert the bus waveform (i.e., either a DC waveform or an AC waveform) to the output AC waveform at the grid frequency for delivery to the AC grid 102.

As discussed above, the input controller 302 is electrically coupled to the input converter 300 and configured to control the operation of the input converter 300 to convert the input DC waveform from the DC source 104 to a bus waveform (e.g., a DC bus waveform) at the power bus 310. To do so, the input controller 302 may provide a plurality of switching and/or control signals to various circuits of the input converter 300 as described in more detail below. Additionally, as discussed below, the input controller 302 may control the operation of the input converter 300 based on a maximum power point tracking ("MPPT") algorithm or methodology.

The output controller 322 is electrically coupled to the output converter 320 and configured to control the operation of the output converter 320 to convert the bus waveform to the output AC waveform suitable for delivery to the AC grid 102. In the illustrative embodiment as discussed in more detail below, the output controller 322 is configured to use a pulse width modulation algorithm to control the output converter 320 such that the output AC waveform is pulse width modulated. To do so, the output controller 322 may provide a plurality of switching and/or control signals to various circuits of the output converter 320 as described in more detail below.

Figure 4:
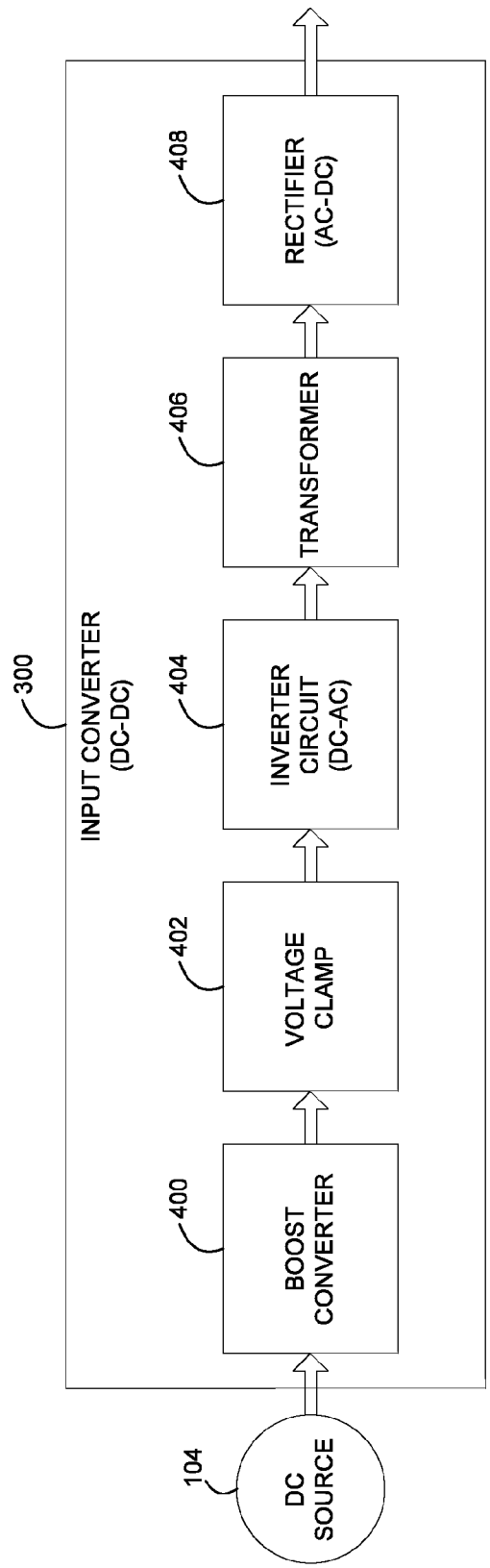
FIG. 4 is a simplified block diagram of one embodiment of an input converter of the inverter of FIG. 3.

Referring now to FIG. 4, in the illustrative embodiment, the input converter 300 is embodied as a DC-to-DC converter. The input converter 300 includes a boost converter 400, a voltage clamp 402, an inverter circuit 404, a transformer 406, and a rectifier 408. The boost converter 400 is embodied as an isolated boost converter and is electrically coupled to the voltage clamp 402 and the inverter circuit 404. The voltage clamp 402 is embodied as an active voltage clamp configured to clamp the voltage of the inverter circuit 404 to a predetermined maximum value based on a switching signal, $q_{IC5}$. The inverter circuit 404 is embodied as a DC-to-AC inverter circuit configured to convert the DC waveform supplied by the DC source 104 to an AC waveform delivered to a primary coil of the transformer 406. The transformer 406 may be embodied as a two or more winding transformer having a primary winding electrically coupled to the inverter circuit 404 and a secondary winding coupled to the rectifier 408. The transformer 406 is configured to convert the first AC waveform supplied by the inverter circuit 404 at the primary winding to a second AC waveform at the secondary winding. The first and second AC waveforms may have substantially equal frequency and may or may not have substantially equal voltages. Additionally, the transformer 406 provides galvanic isolation between the controllers 302, 322. The rectifier circuit 408 is electrically coupled to the secondary winding of the transformer 406 and configured to rectify the second AC waveform to a DC waveform supplied to the power bus 310.

Figure 5:
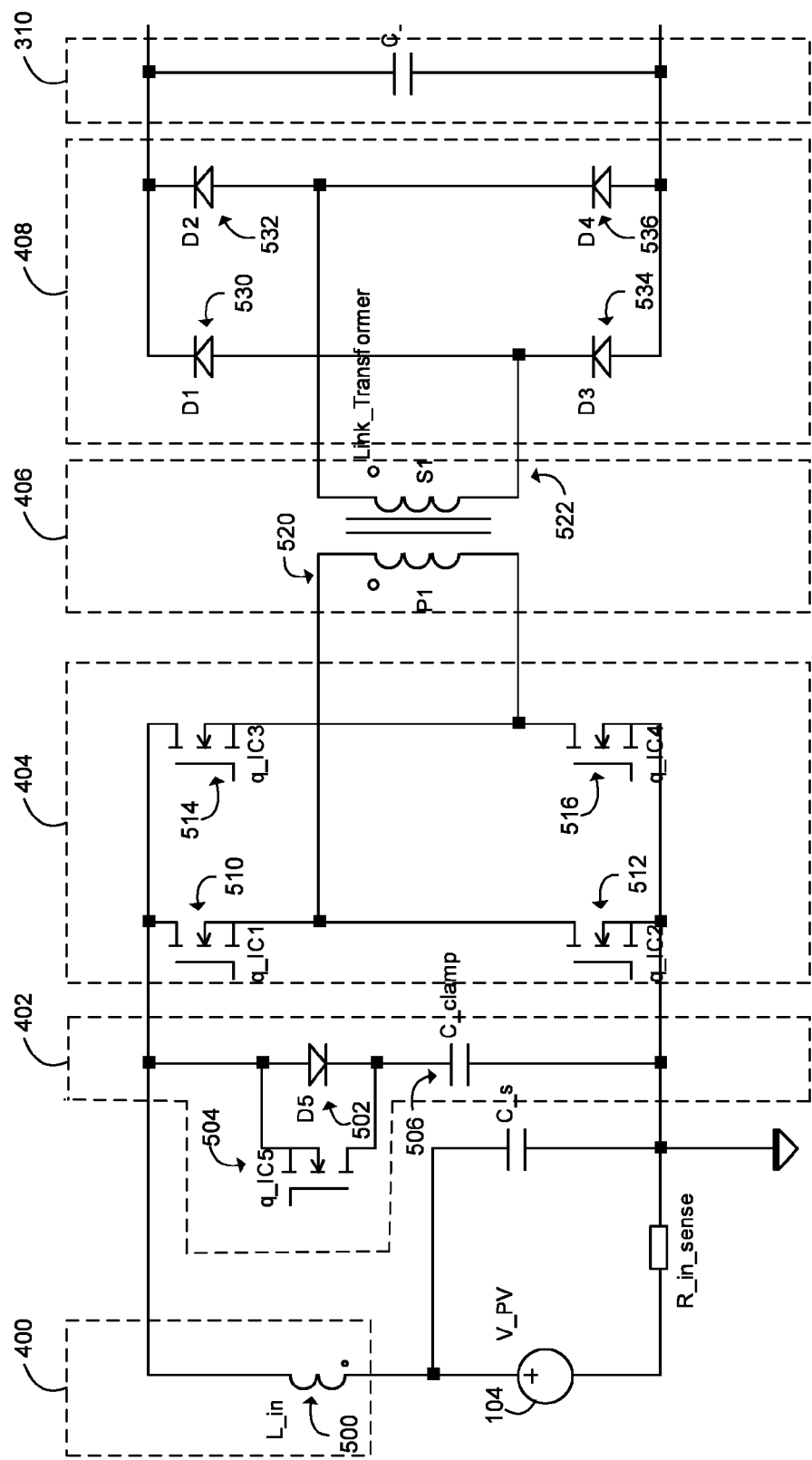
FIG. 5 is a simplified schematic of one embodiment of the input converter of FIG. 4.

Referring now to FIG. 5, one embodiment of the input converter 300 is shown. The illustrative input converter 300 is electrically coupled to the DC source 104, embodied as a photovoltaic cell, via the boost converter 400. In the illustrative embodiment, the boost converter 400 is an isolated boost converter embodied as an inductor 500. The voltage clamp 402 is embodied as an active voltage clamp and includes a diode 502, a switch 504 in parallel with the diode 502, a clamp capacitor 506. However, in other embodiments, a passive voltage clamp may be used. As discussed above, the voltage clamp 402 is operable to clamp the voltage of the inverter circuit 404 to a predetermined maximum voltage.

The inverter circuit 404 is illustratively embodied as a bridge circuit formed by a plurality of switches 510, 512, 514, 516. Each of the switches 510, 512, 514, 516 are configured to receive a corresponding control signal, $q_{IC1}$, $q_{IC2}$, $q_{IC3}$, $q_{IC4}$, from the input controller 302 to control operation of the inverter circuit 404. As discussed below, the input controller 302 uses PWM to control the switches 510, 512, 514, 516 at a relatively high switching frequency (e.g., at a frequency that is substantially higher than the AC grid frequency). As discussed above, the inverter circuit 404 converts the DC waveform from the DC source 104 to a first AC waveform based on the switching signals received from the input controller 302. In the illustrative embodiment, the inverter circuit 404 is embodied as a full-bridge circuit. However, in other embodiments, the inverter circuit 404 may utilize other circuit topologies such as a half-bridge circuit, a push-pull circuit, a flyback circuit, and/or other DC-DC converter circuits may be used in other embodiments. Additionally, although each of the switches 510, 512, 514, 516 is illustrated as MOSFET devices, other types of switches may be used in other embodiments.

The illustrative transformer 406 includes a primary winding 520 electrically coupled to the inverter circuit 404 and a secondary winding 522 electrically coupled to the rectifier circuit 408. The transformer 406 provides galvanic isolation between the primary side converter circuitry (including DC source 104) and the secondary side circuitry (including power bus 310), as well as between the controllers 302, 322. The turns ratio of the transformer 406 may also provide voltage and current transformation between the first AC waveform at the primary winding 520 and the second AC waveform at the secondary winding 522.

The rectifier circuit 408 is electrically coupled to the secondary winding 522 of the transformer 406 and is configured to convert the second AC waveform supplied by the transformer 406 to a DC bus waveform supplied to the power bus 310. In the illustrative embodiment, the rectifier 408 is embodied as a full-bridge rectifier formed from a plurality of diodes 530, 532, 534, 536. Again, in other embodiments, other circuit topologies may be used in the rectifier circuit 408.

The power bus 310 is also shown in FIG. 5. The power bus 310 illustratively includes a bus capacitor 550, which may be embodied as one or more individual capacitive devices. For example, the bus capacitor 550 may be embodied as one or more film capacitors, electrolytic capacitors, or other capacitive devices. Additionally, in the illustrative embodiment, the power bus 310 is a DC power bus and receives the DC bus waveform from the rectifier circuit 408.

Figure 6:
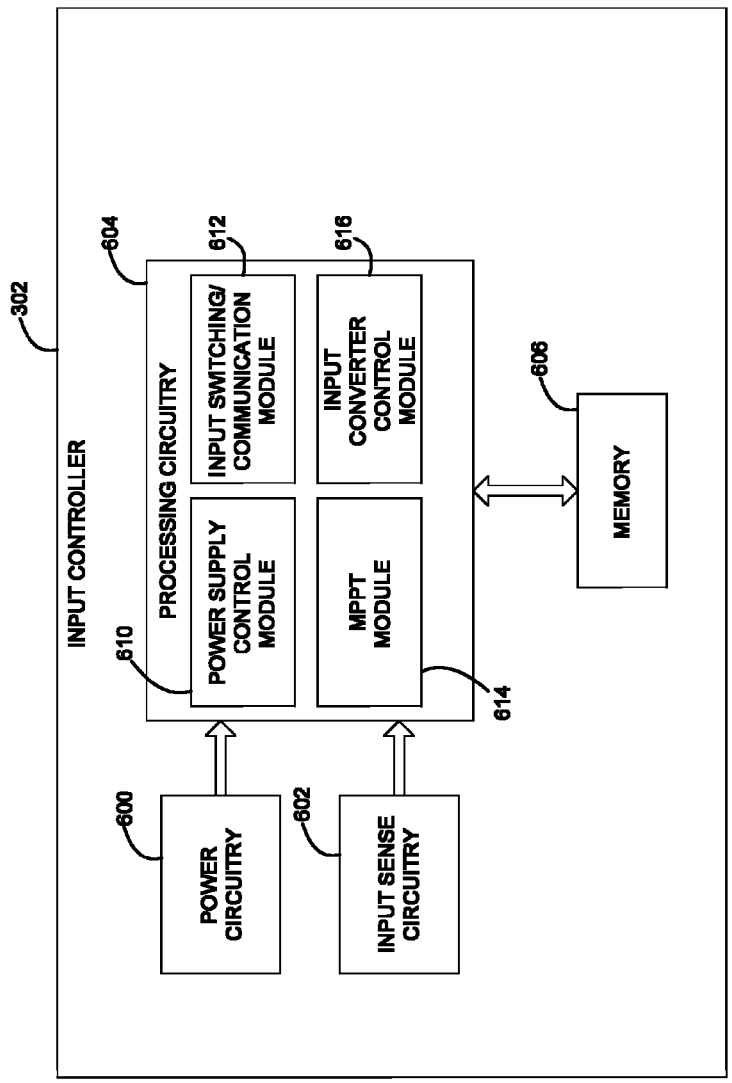
FIG. 6 is a simplified block diagram of one embodiment of an input controller of the inverter of FIG. 3.

Referring now to FIG. 6, one illustrative embodiment of the input controller 302 is shown. As discussed above, the input controller 302 controls the operation of the input converter 300. For example, the input controller 302 is configured to generate a plurality of switching signals to control the operation of the switches 510, 512, 514, 516 of the inverter circuit 404. Additionally, in embodiments wherein the voltage clamp 402 is embodied as an active voltage clamp, the input controller 302 generates one or more switching signals to control the operation of the voltage clamp switch 504.

The input controller 302 includes power circuitry 600, input sense circuitry 602, processing circuit 604, and memory 606. The input controller 302 includes an internal power supply embodied as the power circuitry 600. The power circuitry 600 provides power to the input controller 302 from the DC source 104. The power circuitry 600 may be embodied as any type of power supply circuitry. In the illustrative embodiment, the power circuitry 600 is embodied as a switching power supply powered by the DC source 104. For example, in one particular embodiment, the power circuitry 600 is embodied as step-down or "buck" DC-DC converter that receives power from the DC source 104 and generates the operating power for the various circuitry of the input controller 302. However, in other embodiments, other power supply circuits may be used such as, for example, a single-ended primary inductor converter (SEPIC). Of course, on initial power up, the input controller 302 may not be able to regulate its own power supply. As such, the power circuitry 600 may also include a start-up circuit to provide power from a linear regulator until the input controller 302 is fully "awake" and able to regulate its own power.

Figure 7A:
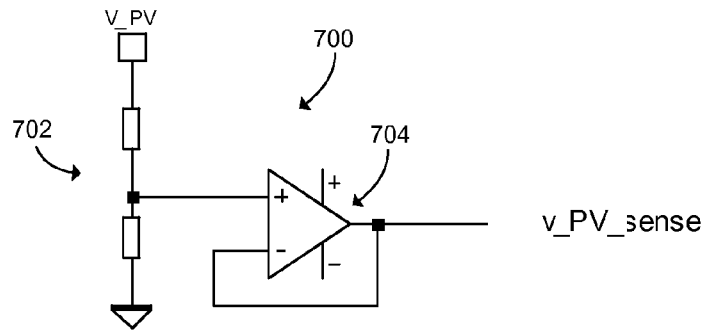
FIGS. 7a-7c are simplified schematics of embodiments of sensing circuits of the input controller of FIG. 6.
Figure 7B:
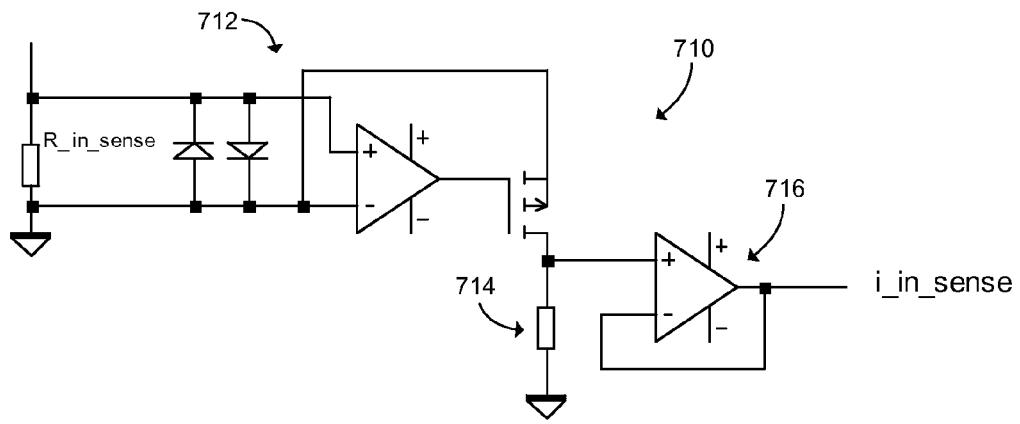
Figure 7C:
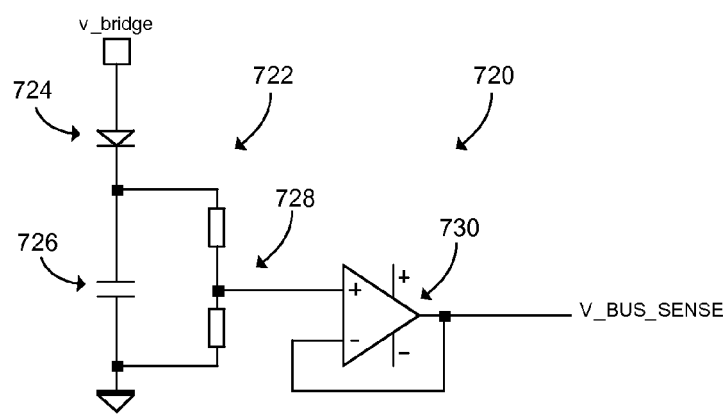

The input sense circuitry 602 includes a plurality of sensing circuits to sense various current and voltages of the inverter 106. In the illustrative embodiment, the input sense circuitry 602 is configured to sense the output voltage of the DC source 104, the output current of the DC source 104, and the voltage of the power bus 310. Of course, due to the isolation between the input converter 300 and the output converter 320, the sense circuitry 602 cannot directly sense or measure the voltage of the power bus 310. As such, the sense circuitry 602 is configured to sense indirectly the voltage of the power bus 310. Illustrative embodiments of the various sense circuits are illustrated in FIGS. 7a-7c. A voltage sense circuit 700 for sensing the output voltage of the DC source 104 is illustrated in FIG. 7a. The voltage sense circuit 700 includes a voltage divider circuit 702 electrically connected to an output of the DC source 104. The output of the voltage divider circuit 702 is received and buffered by a unity gain buffer amplifier 704.

A current sense circuit 710 for sensing the output current of the DC source 104 is illustrated in FIG. 7b. The current sense circuit 710 is coupled across the sense resistor, R_in_sense (see FIG. 5), and includes an operational transconductance amplifier 712. The amplifier 712 generates an output current through a load resistor 714 based on its differential input voltages. The output current of the amplifier 712 is proportional to the current through the sense resister, R_in_sense. A unity gain buffer amplifier 716 buffers the voltage across the load resistor 714 and generates a voltage magnitude proportional to the sensed current.

A bus voltage sense circuit 720 for indirectly sensing the voltage of the power bus 310 is illustrated in FIG. 7c. The bus voltage sense circuit 720 includes a peak detection circuit 722, which is coupled to the output of the input inverter circuit 404. The peak detection circuit 722 includes a peak detection diode 724 and a peak detection capacitor 726 in series with each other. The peak detection circuit 722 also includes a voltage divider circuit 728 coupled in parallel with the peak detection capacitor 726, which provides the appropriate filter response. An output of the voltage divider circuit 728 is received and buffered by a unity gain buffer amplifier 730. Each of the outputs of the sense circuits 700, 710, 720 are subsequently provided to an analog-to-digital converter (ADC) of the processing circuit 604. In some embodiments, the output of the input inverter circuit 404 may be sampled at specific points in time. For example, in one particular embodiment, the voltage of the power bus 310 is indirectly sensed by sampling the output of the input inverter circuit 404 only during those points in time when the diagonal pairs of switches 510, 516 and switches 512, 514 are in the on or conductive state.

Referring back FIG. 6, the processing circuit 604 may be embodied as any type of processing circuitry capable of performing the functions described herein. For example, the processing circuit 604 may be embodied as one or digital signal processors, microprocessors, microcontrollers, or the like. Such processors may have one or more processing cores. Similarly, the memory 606 may be embodied as one or more memory device or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory 606 is illustrated in FIG. 6, it should be appreciated that the input controller 302 may include additional memory devices in some embodiments.

The processing circuitry 604 includes a plurality of control modules, which may be embodied as firmware or software programs, discrete hardware circuitry, and/or a combination of hardware and software stored in, for example, the memory 606. In the illustrative embodiment, the processing circuitry 604 includes an internal power supply control module 610, an input switching frequency/communication module 612, an MPPT control module 614, and an input converter control module 616. Of course, it should be appreciated that additional or other modules, functionality, and features may be included in the processing circuitry 604 depending on the particular implementation.

The internal power supply control module 610 controls the functionality of the power circuitry 600, which provides power to the input controller 302. For example, in embodiments in which the power circuitry 600 is embodied as a switching power supply, the power supply control module 610 generates the switching signals for such switching power supply.

As discussed above, the input controller 302 and the output controller 322 may communicate with each other over the power bus 310 in some embodiments. In such embodiments, the input switching frequency/communication module 612 controls the switching frequency of the input converter 300 to modulate the voltage across the transformer 406, which is subsequently carried across the power bus 310 to the output controller 322. Typically, the voltage across the transformer 406 has an average value with some small variations. However, by further modulating the voltage across the transformer 406, data can be communicated from the input controller 302 to the output controller 322. Such data may include, for example, the output voltage, current, and/or power of the DC power source 104, voltages and currents of components of the input converter 300, error signals, and/or other data from the input controller 302 or the input converter 300. In such embodiments, the use of direct communication (e.g., via a digital isolation channel) between the input controller 302 and the output controller 322 is not needed. One illustrative method for communicating across an isolation barrier is provided in U.S. patent application Ser. No. 12/832,199, entitled "Method for Communicating Across an Isolation Barrier in Power Converters," by Patrick Chapman, the entirety of which is incorporated herein by reference. Further, it should be appreciated that in other embodiments, the communication module 612 may be embodied as a wireless communication device configured to communicate with a corresponding communication module of the output controller 322. In such embodiments, the communication module 612 may utilize any suitable wireless communication technology such as, for example, Wi-Fi™, Zigbee®, WiMAX, Wireless USB, Bluetooth®, and/or other wireless communication technology and/or protocol.

The MPPT module 614 provides maximum power point tracking of the DC power source 104. Specifically, the MPPT module 614 monitors the power output of the DC power source 104 (e.g., a PV module) and generates a current command based on an MPPT algorithm. For example, as discussed above, photovoltaic cells have an operating point at which the values of the current and voltage of the cell result in an ideal or "maximum" power output, which is a function of environmental variables, including light intensity and temperature. As such, the MPPT module 614 attempts to maximize the power output of the DC source 104 during most operating conditions. Of course, it should be appreciated that under some operating conditions, such as at start-up or shutdown or during a rapid change in available sunlight, the MPPT module 614 and/or inverter 106 may actively or passively extract less than the maximum power from the DC source 104.

The input converter control module 616 controls the inverter circuit 404 and performs various voltage checks to ensure proper operation of the inverter 106. To do so, the input converter control module 616 generates a duty cycle command signal and a switching period command signal, which are loaded into associated pulse width modulation (PWM) circuitry to generate the switching signals that are supplied to the input inverter circuit 404. Additionally, as discussed in more detail below in regard to FIG. 12, the input converter control module 616 is configured to determine whether the output voltage of the DC source 104 and the voltage of the power bus 310 are within particular predetermined thresholds. Based on such determinations, the inverter 106 may be turned off and/or the output commands of the input converter control module 616 may be adjusted.

Figure 8:
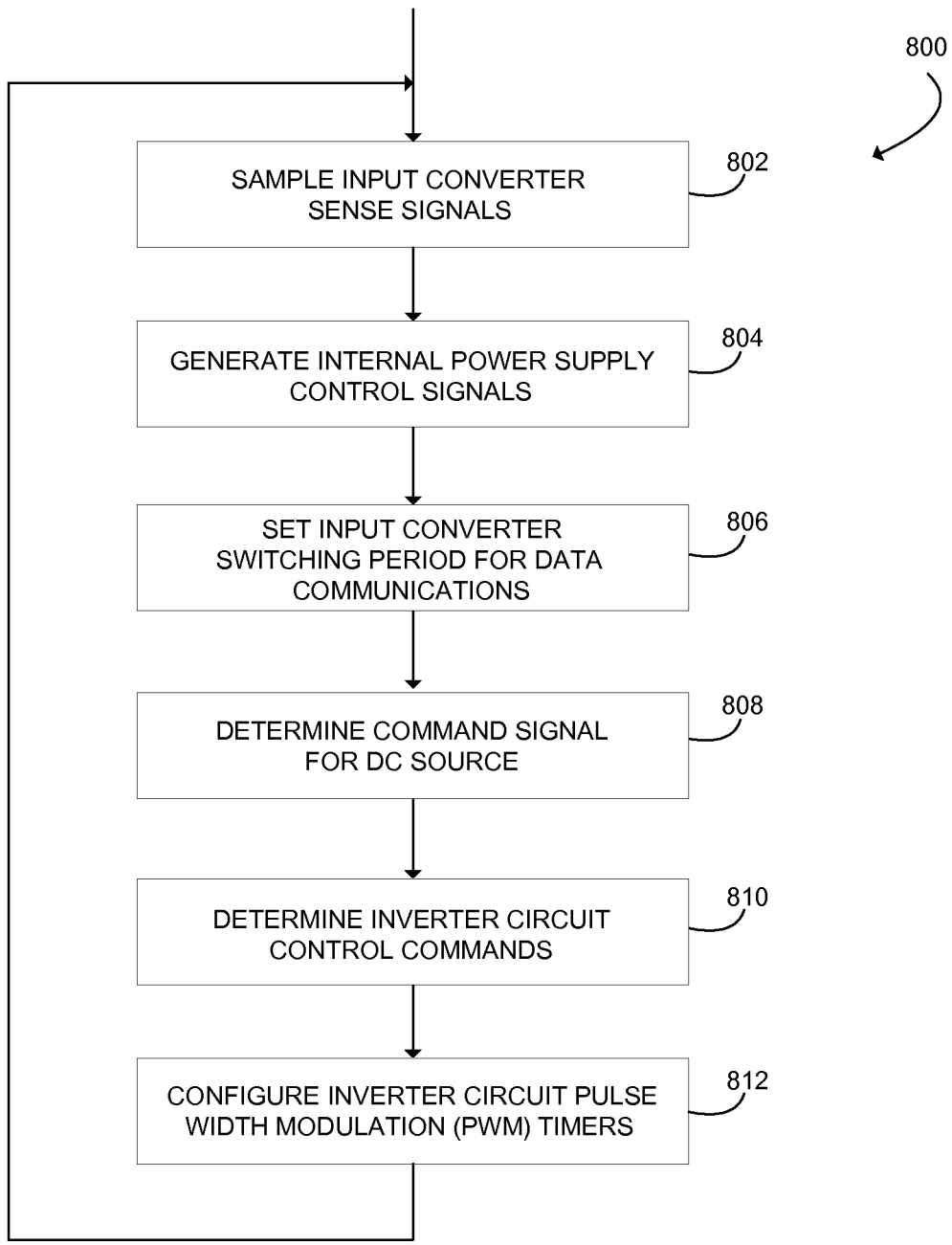
FIG. 8 is a simplified flowchart of one embodiment of a method for controlling an input converter that may be executed by the input controller of FIG. 6.

Referring now to FIG. 8, in use, the input controller 302 may execute a method 800 for controlling the input converter 300. The method 800 begins with block 802 in which the input controller 302 samples various signals of the input controller using the input sense circuitry 602. As discussed above, the output voltage and current of the DC power source 104 are sensed. Additionally, the bus voltage of the power bus 310 is indirectly sensed.

Figure 9:
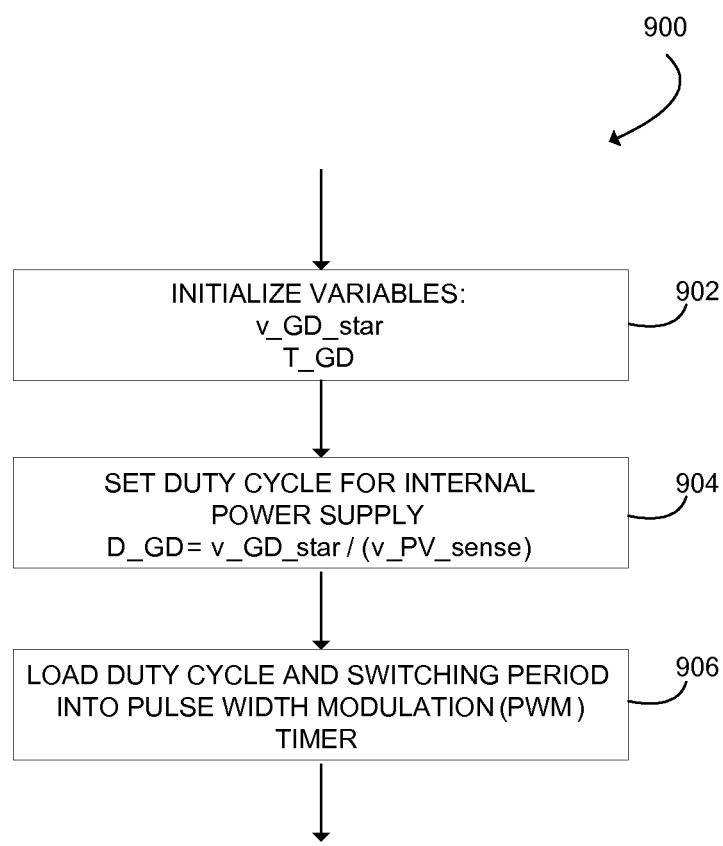
FIG. 9 is a simplified flow chart of one embodiment of a method for controlling a power supply of the input controller of FIG. 6.
Figure 10:
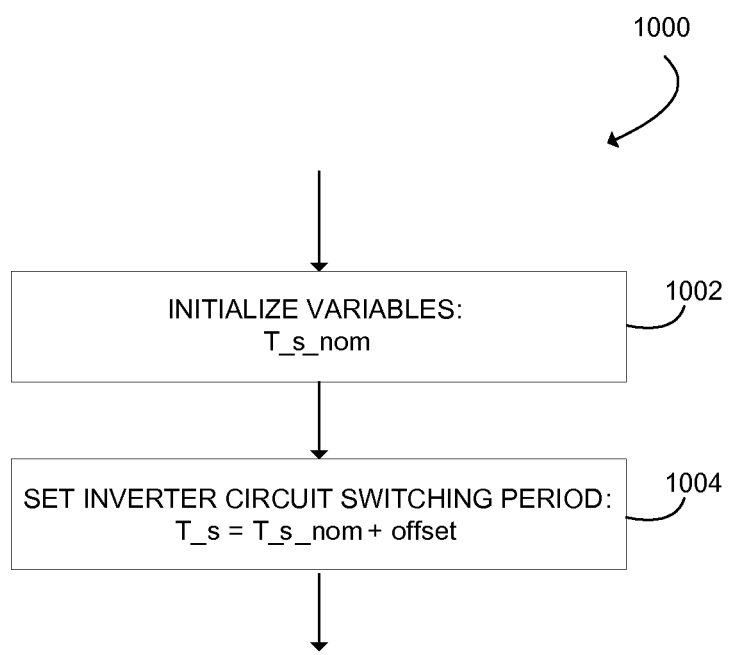
FIG. 10 is a simplified flow chart of one embodiment of a method for generating a switching period for the input converter of FIG. 4 that may be executed by the input controller of FIG. 6.

In block 804, the input controller 302 generates internal power supply control signals to the power circuitry 600. To do so, the input controller 302 may execute a method 900 for controlling the power supply circuitry 600 as shown in FIG. 9. The method 900 begins with block 902 in which data variables are initialized. In the illustrative embodiment, a gate-drive voltage command variable, V_GD_star, and a switching period variable, T_GD, are initialized. In the illustrative embodiment, the power circuitry 600 is configured to supply 9 volts for gate drive and about 3.3 volts for the sensing and control circuitry of the input controller 302. As such, the gate-drive voltage command variable, V_GD_star, is initially set to 9 volts. In block 904, the duty cycle, D_GD, for the power supply PWM timers is calculated. In the illustrative embodiment, the duty cycle is calculated based on the following equation:

$$D\_GD = V\_GD\_star / v\_PV\_sense$$

wherein D_GD is the requested duty cycle, V_GD_star is the gate-drive voltage command, and v_PV_sense is the sensed output voltage of the DC power source 104. Additionally, in some embodiments, the duty cycle, D_GD, may also include a feedback term to improve the control of the duty cycle. After the requested duty cycle has been calculated, the duty cycle and switching period are loaded into the power supply PWM timers to generate the switching signals for the power supply circuitry 600.

Referring back to FIG. 8, in block 806, the switching period of the input converter 300 is determined. As discussed in more detail above, the switching period of the input converter 300 may be adjusted so as to modulate the voltage of the transformer 406 to transmit data from the input controller 302 to the output controller 322. To do so, the input controller 302 may execute a method 1000 for generating a switching period. The method 1000 begins with block 1002 in which data variables are initialized. In the illustrative embodiment, a nominal switching period, T_s_nom, is initialized. The nominal switching period is the standard switching period of the input converter 300 when no data are being transmitted to the output controller 322. Subsequently, in block 1004, the switching period of the input controller 302, T_s is set to the nominal switching period, T_s_nom, plus some predetermined offset amount. By adjusting the switching period in this manner, the voltage across the transformer 406 may be modulated to carry data to the output controller 322, which may then be sensed and demodulated by the output controller 322.

Figure 11:
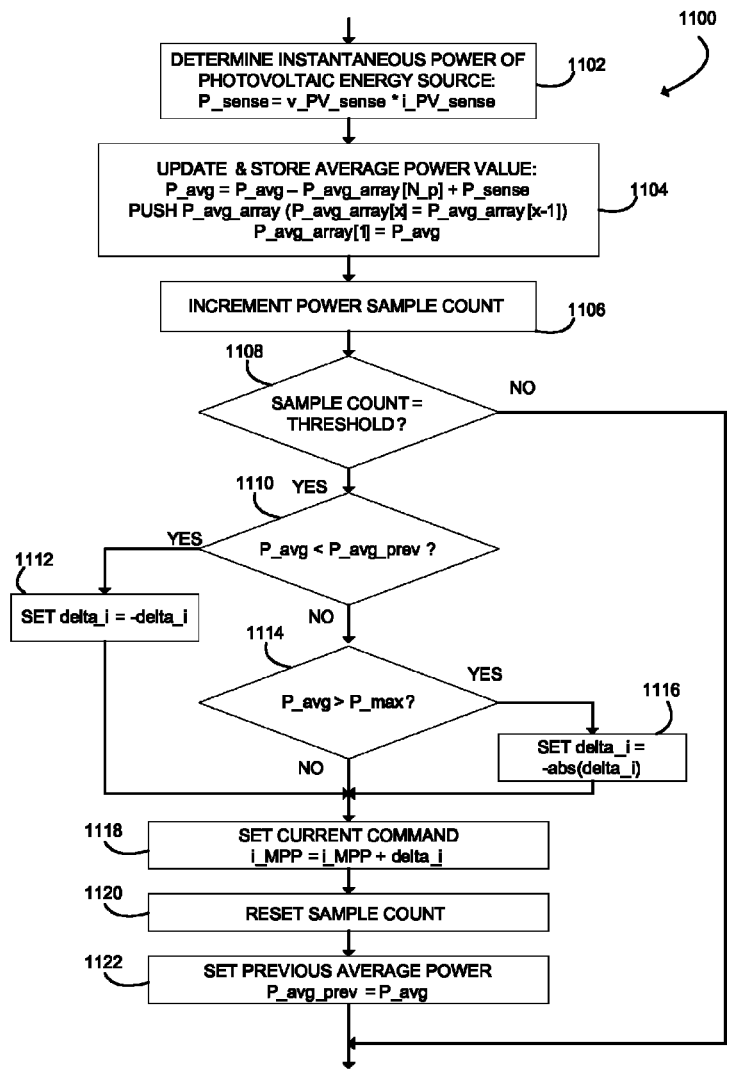
FIG. 11 is s simplified flowchart of one embodiment of a method for controlling a current command signal for an energy source that may be executed by the input controller of FIG. 6.

Referring back to FIG. 8, in block 808, a command signal for the DC source 104 (e.g., a photovoltaic energy source) is determined. The command signal may be embodied as a current command or a voltage command depending on the specific implementation. For example, in one embodiment as shown in FIG. 11, the input controller 302 executes an MPPT method 1100 to generate a current command for the DC source 104. The method 1100 begins with block 1102 in which the instantaneous power output of the DC source 104 is determined. The instantaneous power output of the DC source 104 may be determined by multiplying the sensed voltage and current of the DC source 104, which are generated by the input sense circuitry 602 as discussed above. In block 1104, a windowed average power value for the power of the DC source 104 is calculated. To do so, the oldest average power value is removed from the average window and the newly determined as shown in the pseudo-code of block 1104.

In block 1106, a sample count is incremented and, in block 1108, it is determined whether the sample count is equal to a predetermined threshold. If so, the method 1100 advances to block 1110 in which it is determined whether the currently calculated average power, P_avg, is less than the most previously calculated average power, P_avg_prev. If so, the method 1100 advances to block 1112 in which a requested change in the MPP current command, delta_i, is set to the negative value of the current requested change in MPP current command value. However, if the calculated average power, P_avg, is not less than the most previously calculated average power, P_avg_prev, the method 1100 advances to block 114 in which it is determined whether the calculated average power, P_avg, is greater than a predetermined maximum average power, P_max. If so, the method 1100 advances to block 1116 in which the requested change in MPP current command, delta_i, is set to the negative value of the absolute value of the current change in MPP current command value. Subsequently, in block 1118, the MPP current command, i_MPP, is set. Illustratively, the current command, i_MPP, is set to the sum of the current i_MPP value and the change in the current command value, delta_i. In block 1120, the sample count is reset to zero. Additionally, in block 1122 the previous average power variable, P_avg_prev, is set to the currently calculated average power, P_avg. In this way, the method 1100 determines a current command value, i_MPP, to achieve the maximum or near maximum power output of the DC source 104.

Figure 12:
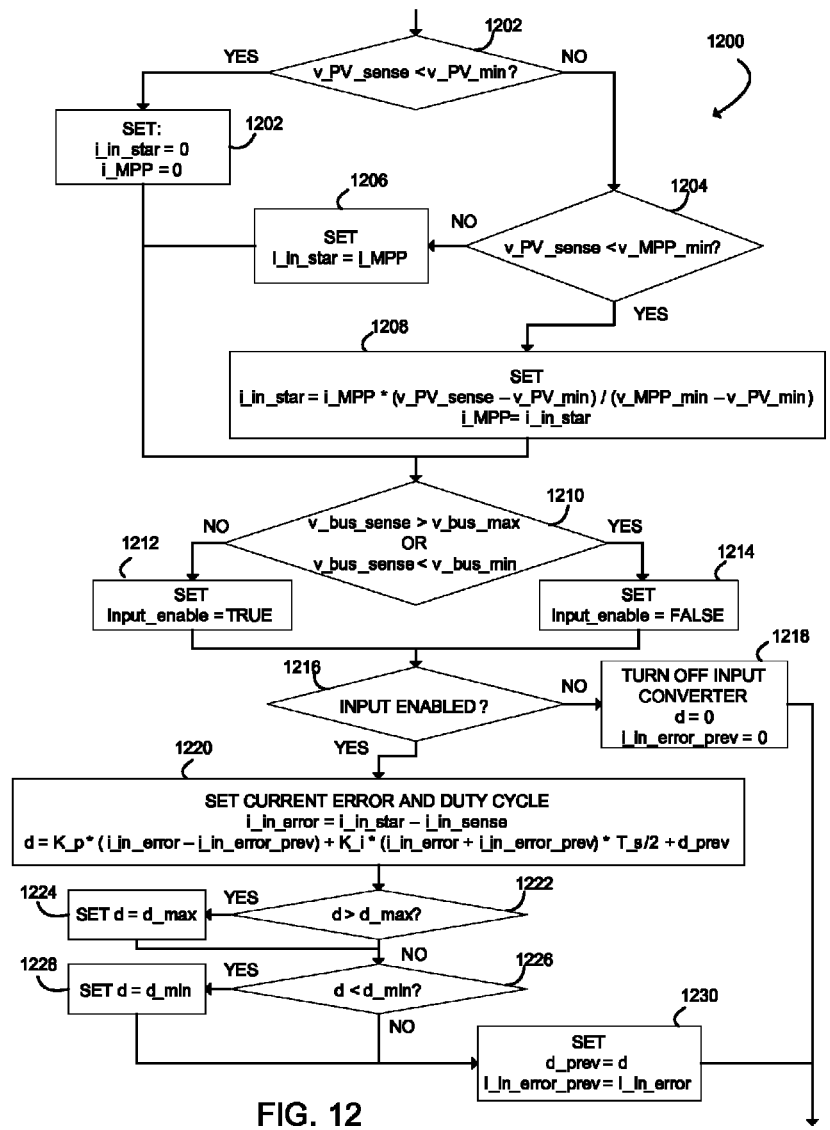
FIG. 12 is a simplified flow chart of one embodiment of a method for controlling the input converter of FIG. 4 that may be executed by the input controller of FIG. 6.

Referring back to FIG. 8, in block 810, the inverter circuit control commands are determined. To so, the input controller 302 may execute a method 1200 for a duty cycle of the input inverter circuit 404 as shown in FIG. 12. The method 1200 begins with block 1202 in which it is determined whether the sensed voltage of the DC source 104, v_PV_sense, is less than a predetermined minimum voltage, v_PV_min. If so, the method 1200 advances to block 1202 in which a current command, i_in_star, and the MPP current command, i_MPP, is set to zero. However, if the sensed voltage of the DC source 104, v_PV_sense, is not less than the predetermined minimum voltage, v_PV_min, the method 1200 advances to block 1202 in which it is determined whether the sensed voltage, v_PV_sense, is less than a predetermined minimum MPP voltage value, v_MPP_min. If not, the method 1200 advances to block 1206 in which the current command, i_in_star, is set to the MPP current command, i_MPP. However, if the sensed voltage, v_PV_sense, is not less than a predetermined minimum MPP voltage value, v_MPP_min, the method 1200 advances to block 1208 in which the current command, i_in_star is determined according to the following algorithm:

$$i\_in\_star = i\_MPP * (v\_PV\_sense - v\_PV\_min) / (v\_MPP\_min - v\_PV\_min)$$

wherein i_in_star is the current command, i_MPP is the MPP current command, v_PV_sense is the sensed voltage of the DC source 104, v_PV_min is the minimum DC source 104 voltage threshold, and v_MPP_min is the minimum MPP voltage threshold. Additionally, the MPP current command is set to zero in block 1208 after calculation of the current command, i_in_star.

In block 1210, it is determined whether the sensed bus voltage of the power bus 310 is outside a predetermined bus voltage maximum, v_bus_max, and bus voltage minimum, v_bus_min. If not, an inverter enable variable, input_enable, is set to TRUE in block 1212. However, if the sensed bus voltage falls outside the predetermined thresholds, the method 1200 advances to block 1214 in which the input enable variable, input_enable, is set to FALSE. Subsequently, in block 1216, it is determined whether the input converter has been enabled or disabled based on the state of the input enable variable, input_enable. If the input enable variable has been set to FALSE, the inverter is turned off in block 1218 by setting the requested duty cycle, d, to zero in block 1218. Additionally, a previous current error variable, i_in_error_prev, is set to zero in block 1218. However, if the input enable variable has been set to TRUE, the method 1200 advances to block 1210 in which the current command error, i_in_error, and the requested duty cycle, d, are set. The current command error, i_in_error is set to the difference of the current command, i_in_star, and the sensed output current of the DC source 104, i_in_sense. Additionally, the duty cycle is calculated according to the following algorithm:

$$d = K\_p*(i\_in\_error - i\_in\_error\_prev) + K\_i*(i\_in\_error + i\_in\_error\_prev)*T\_s/2 + d\_prev$$

in which K_p and K_i are gain constants, i_in_error is the current command error, i_in_error_prev is the previous-most current command error, T_s is the switching period, and d_prev is the previous-most calculated duty cycle.

After the duty cycle, d, has been set in block 1220, the method 1200 advances to block 1222 in which it is determined whether the requested duty cycle, d, is greater than a predetermined maximum duty cycle, d_max. If so, the method 1200 advances to block 1224 in which the duty cycle, d, is set to a the predetermined maximum duty cycle, d_max. In block 1226, it is determined whether the duty cycle, d, is less than a minimum duty cycle, d_min. If so, the method 1200 advances to block 1228 in which the duty cycle, d, is set to the minimum duty cycle, d_min. Subsequently, in block 1230, the previous duty cycle variable, d_prev, is set to the current requested duty cycle, d, and the previous current error variable, i_in_error_prev, is set to the current error, i_in_error.

Figure 13:
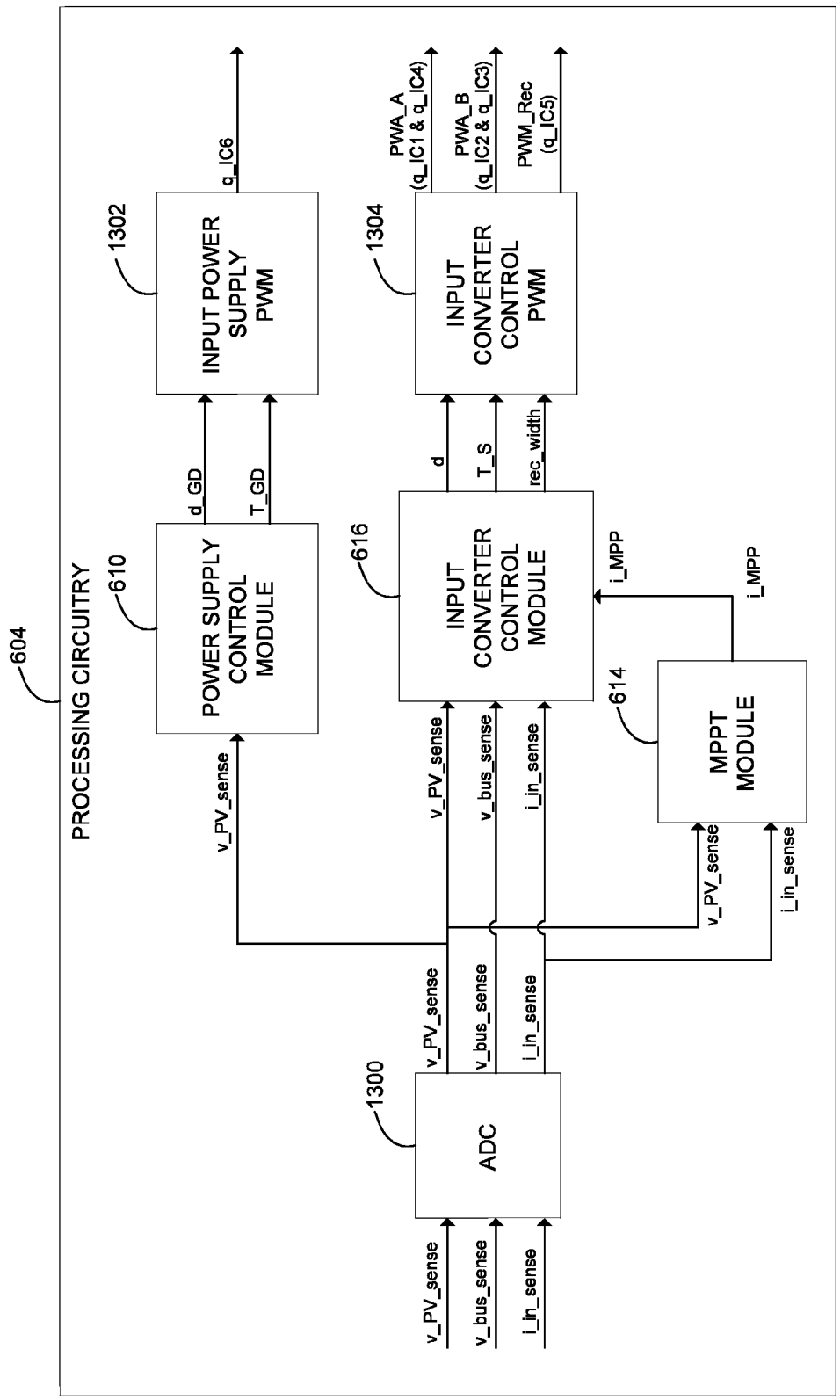
FIG. 13 is a simplified block diagram of one embodiment of the control modules of the input controller of FIG. 6.

Referring back to FIG. 8, after the duty cycle and switching periods have been determined, the method 800 advances to block 812 in which the pulse width modulation (PWM) timers of the processing circuitry 604 are loaded with the determined parameters. The PWM timers subsequently generate the switching signals for the inverter circuit 404. For example, one embodiment of the generation of such switching signals is illustrated in FIG. 13. As shown in FIG. 13, the processing circuitry 604 may include an analog-to-digital converter (ADC) 1300 configured to receive the sensed signals, v_PV_sense, v_bus_sense, and, i_in_sense, from the input sense circuitry 602. The DAC 1300 converts the sensed signals from analog signals to digital signals. The digital representation of the sensed voltage of the DC source 104, v_PV_sense, is provided to the power supply control module 610 of the processing circuitry 604. As discussed above, the power supply control module 610 generates a gate drive duty cycle, d_GD, and a gate drive switching period, T_GD, based on the sensed voltage of the DC source 104, v_PV_sense. The output signals of the power supply control module 610 are provided to an input power supply PWM module 1302, which generates the switching signal, q_IC6, for the power circuitry 600 as discussed above.

The digital representation of the sensed voltage and current of the DC source 104, v_PV_sense and i_in_sense, are provided to the MPPT module 614 of the processing circuitry 604. As discussed above, the MPPT module 614 generates an MPP current command, i_MPP, based on the sensed voltage and current signals. The MPP current command, i_MPP, and the digital representations of the sensed voltage and current of the DC source 104, v_PV_sense and i_in_sense, and the sensed bus voltage of the power bus 310 are provided to the input converter control module 616 of the processing circuitry 604. As discussed above, the input converter control module 616 generates a duty cycle, d, a switching period, T_S, and a clock pulse width command, rec_width, which may be simply assigned by the processing circuitry 604. The command signals generated by the input converter control module 616 are provided to an input converter control PWM module 1304, which generates the switching signals, $q_{IC1}$, $q_{IC2}$, $q_{IC3}$, $q_{IC4}$, to the inverter circuit 404 and the switching signal, $q_{IC5}$, to the active voltage clamp 402. Of course, as discussed above, the processing circuitry 604 may include additional or other modules in other embodiments based on, for example, the particular implementation.

Figure 14:
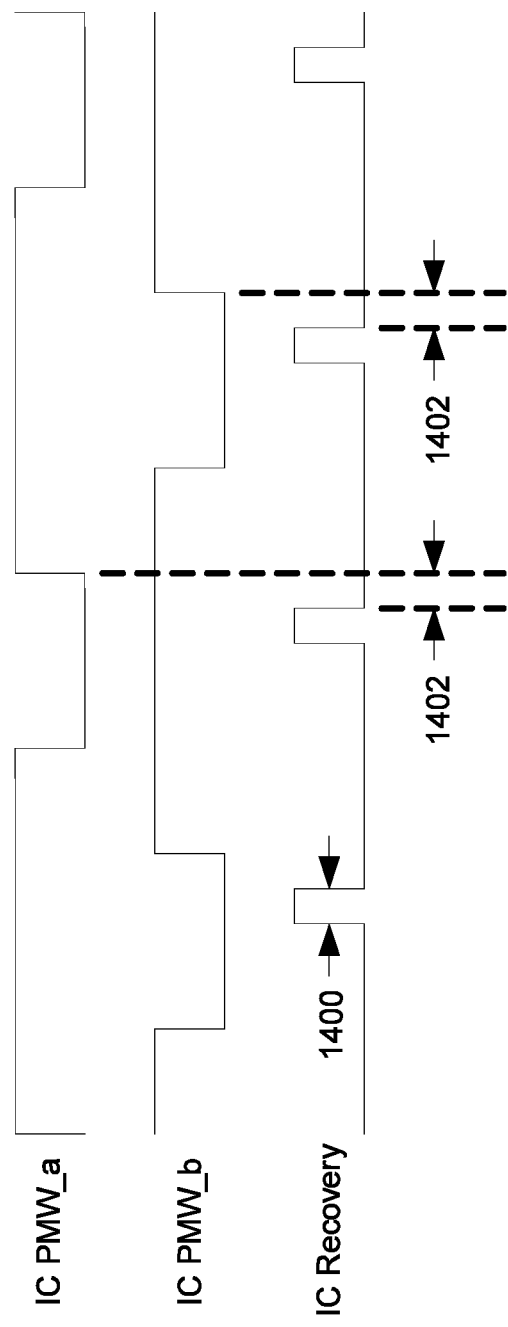
FIG. 14 is a simplified timing diagram of pulse width modulated switching signals generated by the input controller of FIG. 6.

Referring now to FIG. 14, a simplified timing diagram of the switching signals generated by the input converter control PWM module 1304 is shown. The pulse signal, IC PWM_a, provides the switching signals, $q_{IC1}$ and $q_{IC4}$, the pulse signal, IC PWM_b, provides the switching signals, $q_{IC2}$ and $q_{IC3}$, and the pulse signal, IC Recovery, provides the switching signal, $q_{IC5}$. As shown in FIG. 14, the recovery clock runs at twice the switching frequency, T_s. The width 1400 of the recovery clock pulse is equal to about 330 nanoseconds in implementations wherein the inverter 106 is intended for low voltage applications and to about 550 nanoseconds in implementation in which the inverter 106 is intended for high voltage applications. Additionally, the falling edge of the recovery clock has is shifted relative to the rising edge of the pulse signals, IC PWM_a and IC PWM_b, by a width 1402 of about 50 nanoseconds.

Figure 15:
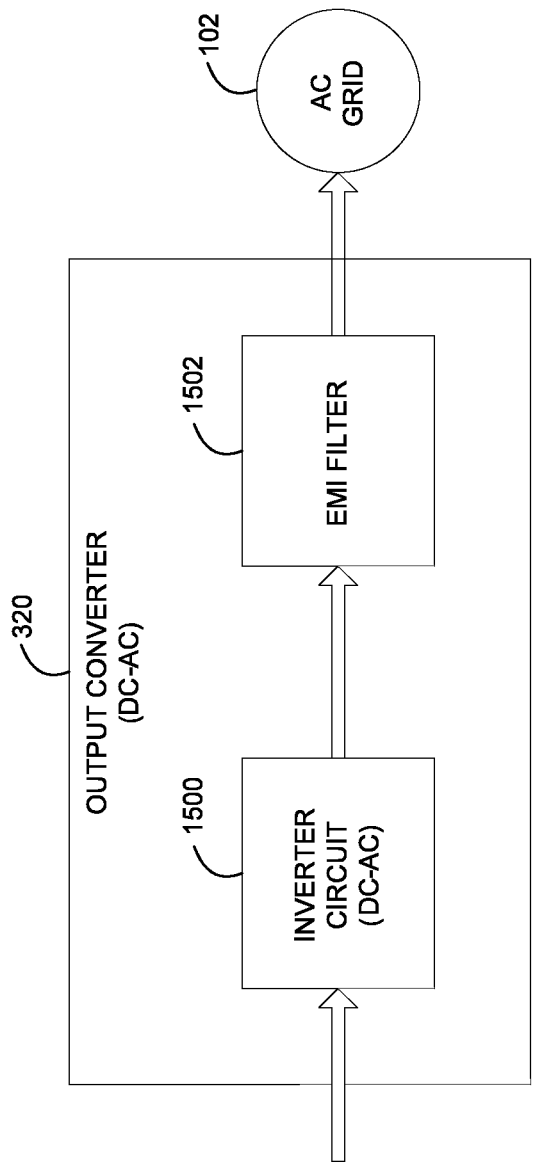
FIG. 15 is a simplified block diagram of one embodiment of an output converter of the inverter of FIG. 3.

Referring now to FIG. 15, in embodiments wherein the input converter 300 is embodied as a DC-to-DC converter, the output converter 320 may be embodied as a DC-to-AC converter. In such embodiments, the output converter 320 includes a DC-to-AC inverter circuit 1500 and an electromagnetic interference (EMI) filter 1502. The inverter circuit 1500 is electrically coupled to the power bus 310 and configured to convert the DC bus waveform to the output AC waveform, which is filtered by the EMI filter 1502.

Figure 16:
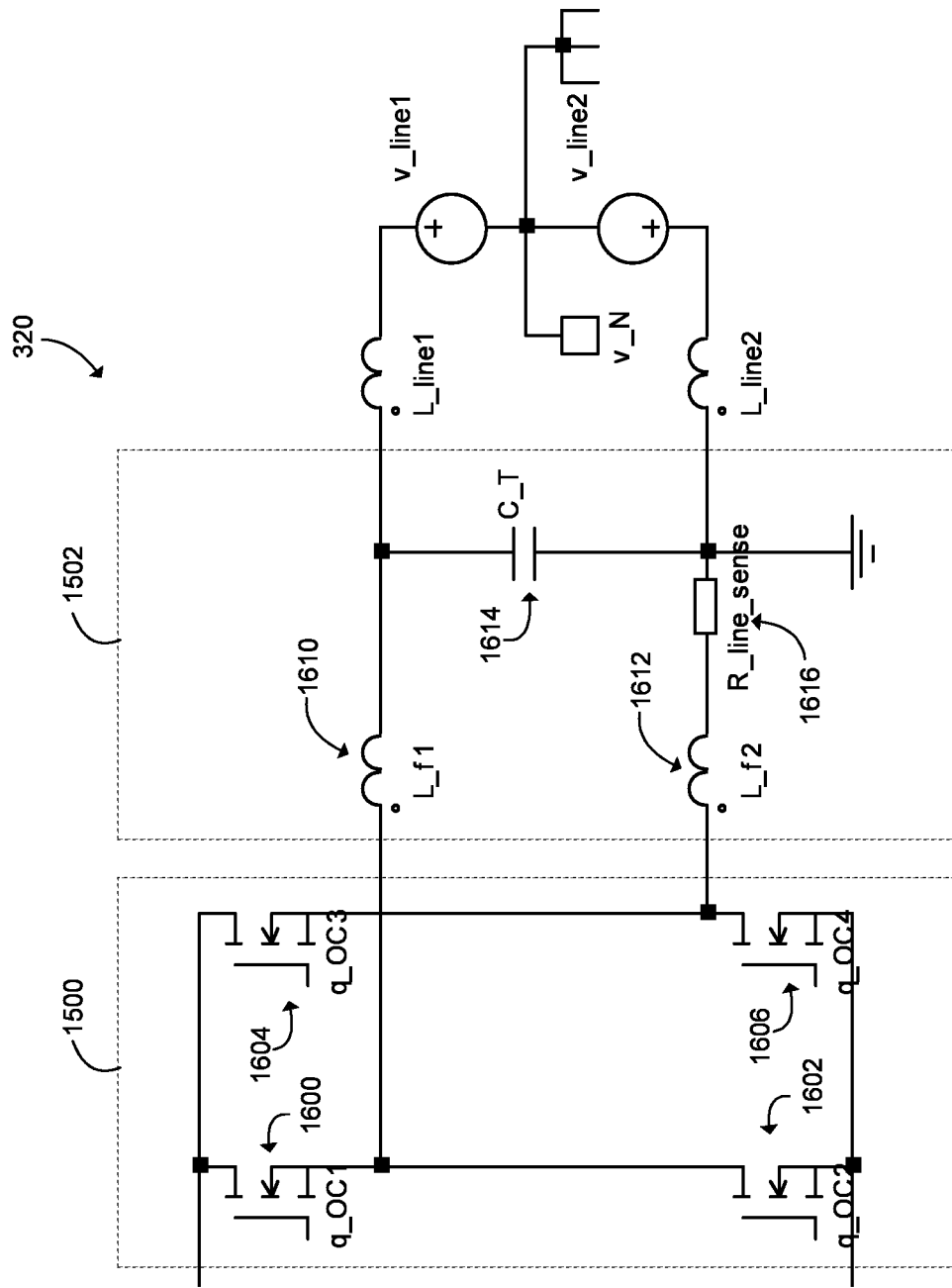
FIG. 16 is a simplified schematic of one embodiment of the output converter of FIG. 15.

One embodiment of the output converter 320 is illustrated in FIG. 16. As discussed above, the inverter circuit 1500 is configured to convert the DC bus waveform to the output AC waveform for delivery to the AC grid 102. The inverter circuit 1500 is illustrative embodied as a bridge circuit formed by a plurality of switches 1600, 1602, 1604, 1606. Each of the switches 1600, 1602, 1604, 1606 are configured to receive a corresponding control signal, $q_{OC1}$, $q_{OC2}$, $q_{OC3}$, $q_{OC4}$, from the output controller 322 to control operation of the inverter circuit 1500. As discussed below, the inverter circuit 1500 may use PWM to control the switches 1600, 1602, 1604, 1606 to generate a pulse width modulated AC waveform. Of course, it should be appreciated that although the illustrative the inverter circuit 1500 is a embodied as a full-bridge circuit, other circuit topologies such as a half-bridge circuit may be used in other embodiments.

The EMI filter 1502 is configured to filter the output voltage by reducing the conducted interference, reducing current ripple, and satisfying regulatory requirements. In the illustrative embodiment, the filter 1502 includes differential-mode inductors 1610, 1612 and a line filter capacitor 1614. The output converter 320 also includes an output current sense resistor 1616.

Figure 17:
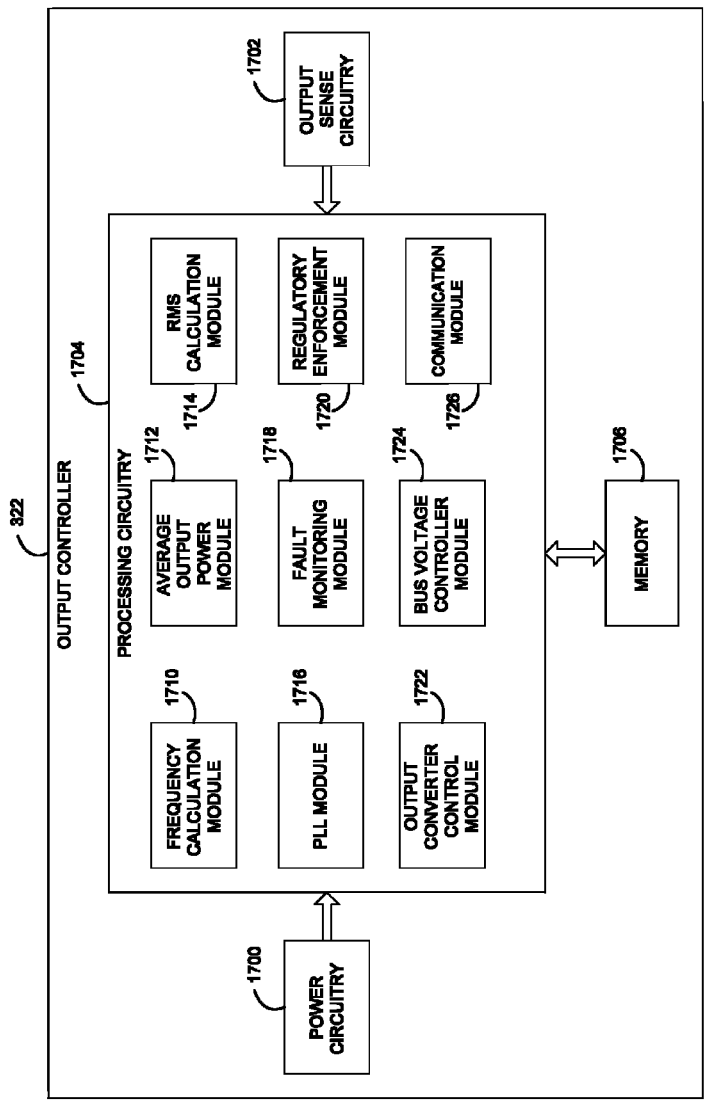
FIG. 17 is a simplified block diagram of one embodiment of an output controller of the inverter of FIG. 3.

Referring now to FIG. 17, one illustrative embodiment of the output controller 322 is shown. As discussed above, the output controller 322 controls the operation of the output converter 320. For example, the output controller 322 is configured to generate a plurality of switching signals to control the operation of the switches 1600, 1602, 1604, 1606 of the inverter circuit 1500. Illustratively, the output controller 322 includes power circuitry 1700, output sense circuitry 1702, processing circuitry 1704, and memory 1706. The power circuitry 1700 provides power to the output controller 322 from the AC grid 102. The power circuitry 1700 may be embodied as any type of power supply circuitry. For example, in some embodiments, the power circuitry 1700 may be embodied as a switching power supply similar to the power circuitry 600 of the input controller 302 described above.

Figure 18A:
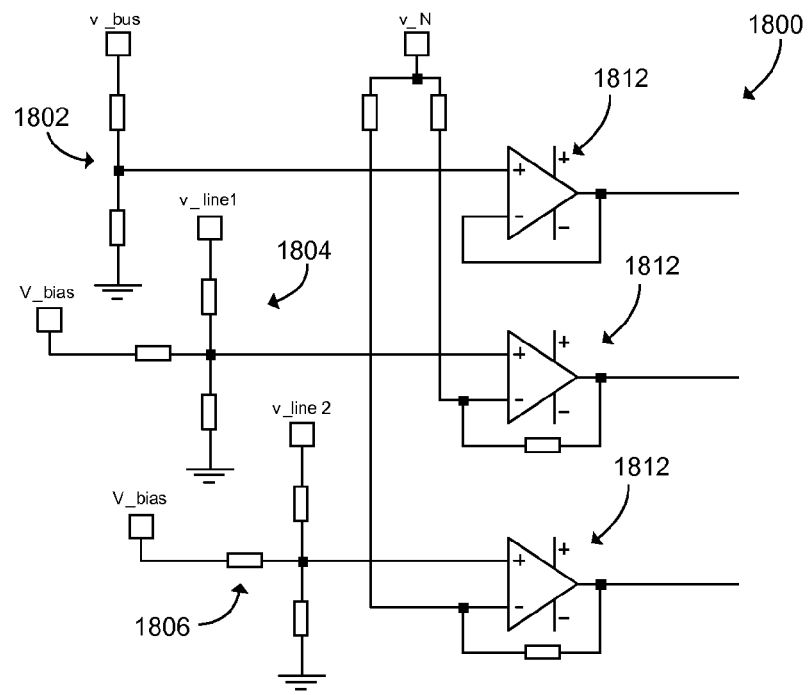
FIGS. 18a-18c are simplified schematics of embodiments of sensing circuits of the output controller of FIG. 17.
Figure 18B:
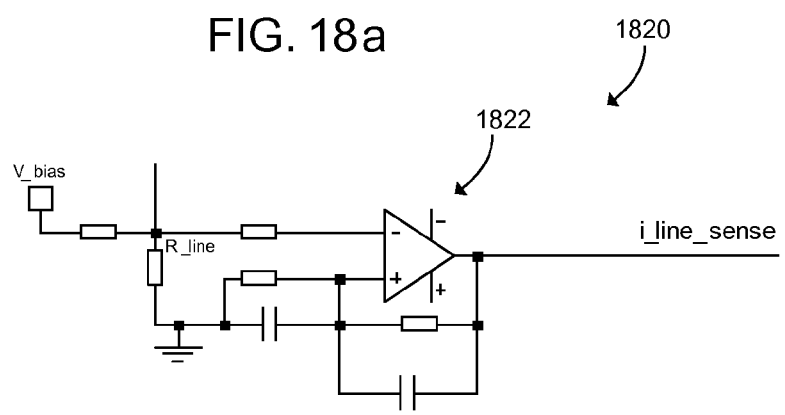
Figure 18C:
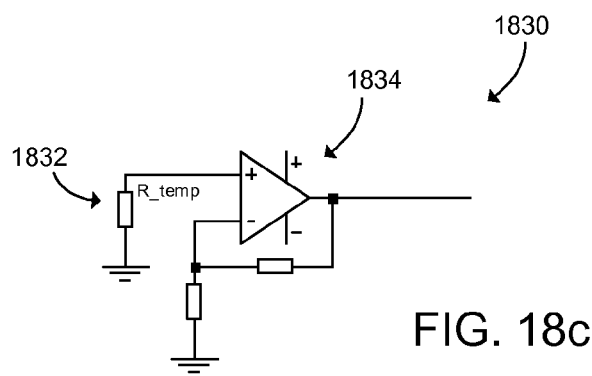

The output sense circuitry 1702 includes a plurality of sensing circuits to sense various current and voltages of the inverter 106. In the illustrative embodiment, the output sense circuitry 1702 is configured to sense the bus voltage of the power bus 310, the line voltages and current of the AC grid 102, and a temperature of the inverter 106. Illustrative embodiments of the various sense circuits are illustrated in FIGS. 18*a*-18*c*. A voltage sense circuit 1800 for sensing the bus voltage of the power bus 310 and the line voltages of the AC grid is illustrated in FIG. 18*a*. The voltage sense circuit 1800 includes a voltage divider circuit 1802 electrically connected to the input of the output inverter circuit 1500 to sense the bus voltage of the power bus 310, a voltage divider circuit 1804 electrically connected to one line of the AC grid 102 to sense the line voltage, and a voltage divider circuit 1806 electrically connected to another line of the AC grid 102 to sense the line voltage. Each of the outputs of the voltage divider circuits 1802, 1804, 1806 are provided to a corresponding buffer amplifier, 1812, 1814, 1816. Additionally, the buffer amplifiers 1814, 1816 are offset to produce a strictly positive output.

A current sense circuit 1820 for sensing the output current of the inverter 106 is illustrated in FIG. 18*b*. The current sense circuit 1820 is coupled across the output current sense resistor 1616, and includes a buffer amplifier 1822. Additionally, a temperature sense circuit 1830 for sensing a temperature of the inverter 106 is illustrated in FIG. 18*c*. The temperature sense circuit 1830 is coupled across a temperature sensor 1832 and includes a buffer amplifier 1824.

Referring back FIG. 17, the processing circuit 1704 may be embodied as any type of processing circuitry capable of performing the functions described herein. For example, the processing circuit 1704 may be embodied as one or digital signal processors, microprocessors, microcontrollers, or the like. Such processors may have one or more processing cores. Similarly, the memory 1706 may be embodied as one or more memory device or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory 1706 is illustrated in FIG. 17, it should be appreciated that the output controller 322 may include additional memory devices in some embodiments.

The processing circuitry 1704 includes a plurality of control modules, which may be embodied as firmware or software programs, discrete hardware circuitry including both digital and analog circuitry (e.g., comparators, operational amplifiers, etc.), and/or a combination of hardware and software stored in, for example, the memory 1706. In the illustrative embodiment, the processing circuitry 1704 includes a frequency calculation module 1710, an average output power module 1712, an RMS calculation module 1714, a phase-lock-loop (PLL) module 1716, a fault monitoring module 1718, a regulatory enforcement module 1720, an output converter control module 1722, a bus voltage controller module 1724, and a demodulation communication module 1726.

The frequency calculation module 1710 is configured to determine the frequency of the AC grid 102. To do so, the frequency calculation module 1710 may receive an output of the PLL module 1716, which is configured to lock onto the frequency of the AC grid 102. The average output power module 1712 and the RMS calculation module 1714 are configured to determine parameters of the output power of the inverter 106. Specifically, the average output power module 1712 determines the average output power of the inverter 106 and the RMS calculation module 1714 determines the RMS output power of the inverter 106 based on the sensed output voltage and current values of the inverter 106. The fault monitoring module 1718 monitors the operations of the inverter 106 for faults. For example, the fault monitoring module 1718 ensures that the parameters of the inverter 106 are within predefined thresholds. Additionally, the fault monitoring module 1718 may include island detection functionality, overheating detection (e.g., via use of the temperature sensor 1832), and/or the like.

Figure 19:
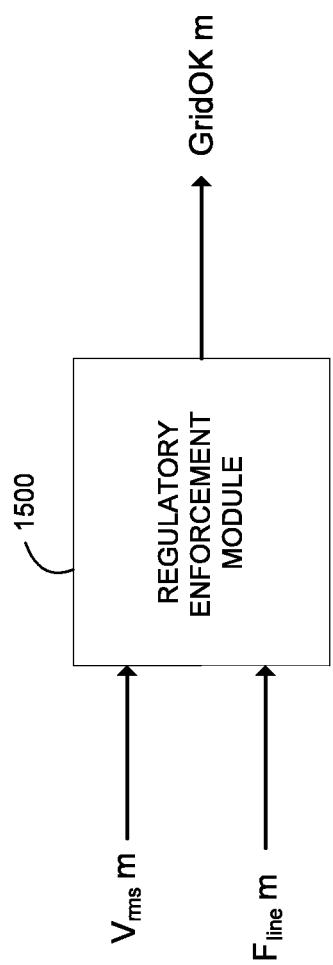
FIG. 19 is a simplified schematic of one embodiment of a regulatory circuit of the output controller of FIG. 17.
Figure 20:
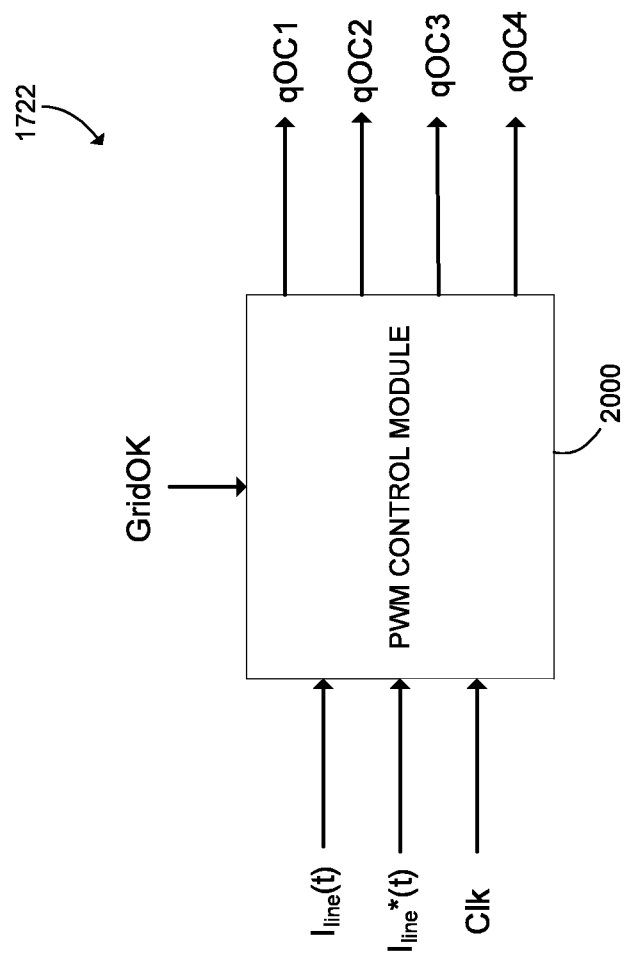
FIG. 20 is a simplified schematic of one embodiment of a pulse width modulated gate drive signals generator of the output controller of FIG. 17.

The regulatory enforcement module 1720 ensures the inverter 106 is operating within the parameters defined by particular power regulatory guidelines. One embodiment of the regulatory enforcement module 1720 is illustrated in FIG. 19. The regulatory enforcement module 1720 receives various parameter signals of the inverter 106 and generates an output converter enable signal, GridOK, based on whether the parameter signals fall within a predefined limit. In the illustrative embodiment, the regulatory enforcement module 1720 implements the regulatory specifications outlined in the *IEEE 1547 Standard for Interconnecting Distributed Resources with Electric Power Systems* (2003), but may implement additional or other regulatory specifications in other embodiments. As shown in FIG. 19, the regulatory enforcement module 1720 receives an average output voltage signal of the inverter 106, $V_{RMS}$, and an output line frequency signal, $f_{line}$. The regulatory enforcement module 1720 compares the parameter signals to various thresholds and, if the parameter signals exceed any one threshold, initiates a time window of varying length based on the particular threshold. If the parameter signal continues to exceed the particular threshold for the duration of the time window, the regulatory enforcement module 1720 determines that the inverter 106 is operating outside of the regulatory specification and turns the output of the inverter 106 off by setting the output converter enable signal, GridOK, to FALSE. The regulatory enforcement module 1720 may then recheck the parameter signals after some period of time (e.g., five minutes) and assert the output converter enable signal, GridOK, if the parameter signals fall within the regulator specification. Again, as discussed above, the regulatory enforcement module 1720 may implement additional or other regulatory specifications in other embodiments.

Referring now back to FIG. 17, the output converter control module 1722 controls the operation of the inverter circuit 1500. To do so, the output converter control module 1722 generates switching signals to the switches 1600, 1602, 1604, 1606 of the inverter circuit 1500. In the illustrative embodiment, the output converter control module 1722 is embodied as a PWM control module 2000. The PWM control module 2000 receives a measured output current signal, tine (t), of the output converter 322 and an output current command signal, $I_{line}*(t)$. The PWM control module 2000 also receives a clock input signal, Clk, and the output converter enable signal, GridOK. If the output converter enable signal, GridOK, is asserted, the PWM control module 2000 is configured to determine an error correction based on the measured output current signal, $I_{line}$ (t), and the output current command signal, $I_{line}*(t)$, and generate the PWM switching signals, qOC1, qOC2, qOC3, and qOC4, based thereon. To do so, the PWM control module 2000 may be configured to use any suitable PWM technique including, for example, hysteresis PWM, average current mode PWM, or other PWM technique. It should be appreciated that in such embodiments the PWM control module 2000 may receive additional or other inputs (e.g., line frequency, power bus voltage, etc.) depending upon the particular PWM technique used. One PWM technique that may be used by the PWM control module 2000 is described in described in U.S. patent application Ser. No. 12/960,208, entitled "Variable Duty Cycle Switching with Imposed Delay" by Alex Gray et al., the entirety of which is incorporated herein by reference.

Figure 21:
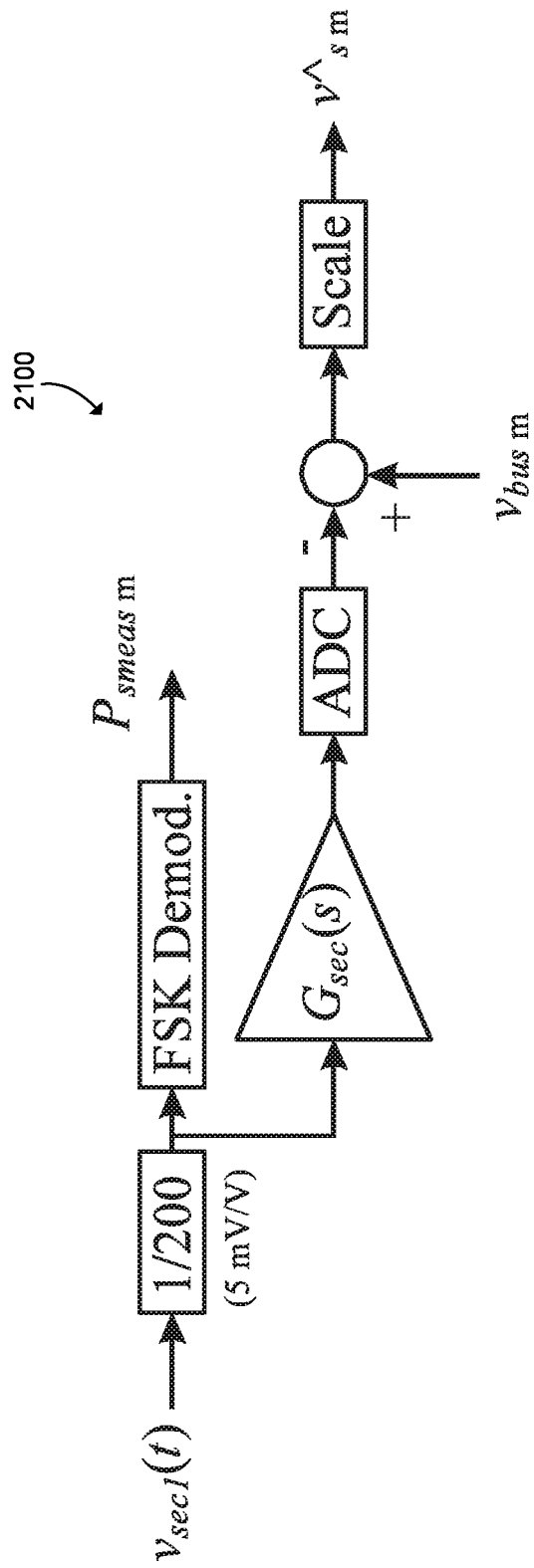
FIG. 21 is a simplified block diagram of one embodiment of a communication logic circuit of the output controller of FIG. 17.

Referring back to FIG. 17, the communication module 1726 is configured to communicate with the communication module 612 of the input controller 302. In embodiments in which the communication module 612 is configured to transmit data across the power bus 310, the communication module 1726 is configured to demodulate the voltage received across the secondary of the transformer 406 to extract any data sent by the input controller 302. By sensing the secondary voltage of the transformer 406, the frequency pattern can be determined and used to decode any data sent by the input controller 302. One illustrative communication logic circuit 2100 is illustrated in FIG. 21. The communication circuit 2100 senses the secondary voltage of the transformer 406 and applies a frequency shift key (FSK) algorithm to retrieve the modulated data. Additionally, in some embodiments, the communication circuit 2100 may also measure the average voltage across the input rectifier 408. The average voltage may then be subtracted from the bus voltage of the power bus 310 to produce an estimate of the DC power source 104. Of course, it should be appreciated that other logic circuits may be used in other embodiments to demodulate the voltage signal to retrieve the transmitted data. Additionally, in those embodiments in which the communication module 612 of the input controller 302 is configured wirelessly transmit data, the communication module 1726 is configured to receive such wireless data.

Referring back to FIG. 17, it should be appreciated that only illustrative control modules and functionality of the output controller 322 have been illustrated and described for clarity of the description. However, it should be appreciated that in other embodiments, the output controller 322 may include additional or other modules, functionality, and features for controlling the operation of the output converter 320 and the inverter 106.

Certain embodiments of the present disclosure have been described. Nevertheless, it will be understood that various modifications may be made without departing from the spirit and scope of the disclosure. For example, any of a wide variety of known non-resonant and resonant switching power converter topologies may be used in place of the specific converter embodiments described herein. The unipolar input source may be a fuel cell or another kind of DC source. The inverter controller may comprise elements for regulatory and safety monitoring and control (e.g., circuits or processes for disabling the inverter in the event of AC grid fault or input source fault, islanding protection). Switches in power converters are shown to be MOSFETs and to comprise diodes across their terminals. It is understood that other types of switches may be used (e.g., bipolar transistors, IGBTs) and that diodes may be intrinsic to the semiconductor switch or may be discrete devices. Switches may also be provided with passive or active snubbers to prevent losses and/or to limit voltage or current stresses.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. A method for controlling a multi-stage inverter for converting direct current (DC) power from a DC source to alternating current (AC) power, the multi-stage inverter including a DC power bus, the method comprising:
   controlling operation of an input converter of the multi-stage inverter electrically coupled to the DC power bus with an input controller to (i) convert the DC power from the DC source to a DC power signal supplied to the DC power bus and (ii) modulate the DC power signal to communicate data from the input controller to an output controller over the DC power bus, wherein the output controller is galvanically isolated from the input controller; and
   controlling operation of an output converter of the multi-stage inverter electrically coupled to the DC power bus with the output controller;
   wherein to modulate the DC power signal comprises to modulate a bus voltage of the DC power bus to communicate the data from the input controller to the output controller.

2. The method of claim 1, further comprising transmitting data from the output controller to a remote device over an AC power line.

3. The method of claim 1, wherein controlling operation of the input converter comprises controlling the input converter to draw a maximum amount of power from a photovoltaic (PV) module.

4. The method of claim 1, wherein controlling operation of the input converter comprises sensing a magnitude of a current output and a voltage output of the DC source.

5. The method of claim 4, wherein controlling the operation of the input converter further comprises generating a current command signal based on the magnitude of the current output and the voltage output of the DC source.

6. The method of claim 4, wherein controlling the operation of the input converter further comprises sensing a magnitude of the bus voltage of the DC power bus.

7. The method of claim 6, wherein controlling the operation of the input converter further comprises generating a plurality of switching signals for an inverter circuit of the input controller based on the magnitude of the current output, the voltage output, and the bus voltage.

8. The method of claim 1, further comprising:
   controlling the operation of the input converter with the input controller to convert an input DC waveform to an output DC waveform;
   supplying the output DC waveform to the DC power bus; and
   controlling the operation of the output converter with the output controller to converter the output DC waveform to an AC waveform.

9. The method of claim 1, further comprising supplying power to the input controller from the DC source.

10. The method of claim 1, wherein controlling the operation of the output converter comprises controlling the operation of the output converter to convert a DC waveform to an AC waveform suitable for delivery to an AC grid, and further comprising supplying power to the output converter from the AC grid.

11. The method of claim 1, wherein controlling the operation of the output converter comprises sensing a magnitude of the bus voltage of the DC power bus and generating a plurality of switching signals for an inverter circuit of the output controller based on the magnitude of the bus voltage and an average power bus voltage value.

12. An inverter for converting direct current (DC) power from a DC source to alternating current (AC) power, the inverter comprising:
  an input converter electrically coupled to a power bus and configured to convert an input DC waveform of the DC source to a bus waveform supplied to the power bus based on a first plurality of switching signals;
 an output converter electrically coupled to the power bus and configured to convert the bus waveform to an output AC waveform based on a second plurality of switching signals;
  an input controller electrically coupled to the input converter, the input controller comprising (i) first sensing circuitry to sense a magnitude of an output voltage of the DC source, a magnitude of an output current of the DC source, and a magnitude of a bus voltage of the power bus and (ii) a first control module configured to generate the first plurality of switching signals based on the magnitude of the output voltage, the output current, and the bus voltage; and
  an output controller electrically coupled to the output converter and galvanically isolated from the input controller, the output controller comprising (i) second sensing circuitry to sense a magnitude of the bus voltage of the power bus (ii) a second control module configured to generate the second plurality of switching signals based on the magnitude of the bus voltage and an average power bus voltage value;
 wherein the input controller comprises communication circuitry configured to control the input converter to modulate the bus waveform to communicate data between the input controller and the output controller over the power bus.

13. The inverter of claim 12, wherein the input controller further comprises an internal power supply configured to generate power for the input controller based on a power signal received from the DC source.

14. The inverter of claim 12, wherein the output controller further comprises an internal power supply configured to generate power for the output controller based on a power signal received from an AC grid.

15. The inverter of claim 12, wherein the output controller further comprises a power line communication circuit configured to communicate with a remote device over an AC power line.

16. One or more non-transitory, machine-readable storage media comprising a plurality of instructions stored thereon that, in response to execution, cause a multi-stage inverter for converting direct current (DC) power from a DC source to alternating current (AC) power, to:
  control operation of an input converter of the multi-stage inverter electrically coupled to a DC power bus of the multi-stage inverter with an input controller to (i) convert the DC power from the DC source to a DC power signal supplied to the DC power bus and (ii) modulate the DC power signal to communicate data from the input controller to an output controller over the DC power bus, wherein the output controller is galvanically isolated from the input controller; and
  control operation of an output converter of the multi-stage inverter electrically coupled to the DC power bus with the output controller,
  wherein to modulate the DC power signal comprises to modulate a bus voltage of the DC power bus to communicate the data from the input controller to the output controller.

17. The one or more non-transitory, machine readable storage media of claim 16, wherein to control operation of the input converter comprises to control the input converter to draw a maximum amount of power from a photovoltaic (PV) module.

18. The one or more non-transitory, machine readable storage media of claim 16, wherein to control operation of the input converter comprises to sense a magnitude of a current output and a voltage output of the DC source.

19. The one or more non-transitory, machine readable storage media of claim 18, wherein to control the operation of the input converter further comprises to sense a magnitude of the bus voltage of the DC power bus.

20. The one or more non-transitory, machine readable storage media of claim 16, wherein to control the operation of the output converter comprises to sense a magnitude of the bus voltage of the DC power bus and generate a plurality of switching signals for an inverter circuit of the output controller based on the magnitude of the bus voltage and an average power bus voltage value.

* * * * *